(12) United States Patent
Wang et al.

(10) Patent No.: US 11,956,847 B2
(45) Date of Patent: Apr. 9, 2024

(54) TIMER-BASED DISCONTINUOUS RECEPTION FOR SIDELINK COMMUNICATIONS

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Sony Akkarakaran, Poway, CA (US); Juan Montojo, San Diego, CA (US); Junyi Li, Franklin Park, NJ (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 497 days.

(21) Appl. No.: 17/184,418

(22) Filed: Feb. 24, 2021

(65) Prior Publication Data
US 2022/0272789 A1     Aug. 25, 2022

(51) Int. Cl.
*H04W 76/28*     (2018.01)
*H04W 76/14*     (2018.01)

(52) U.S. Cl.
CPC ........... *H04W 76/28* (2018.02); *H04W 76/14* (2018.02)

(58) Field of Classification Search
CPC .............................. H04W 76/28; H04W 76/14

USPC ........................................................ 370/329
See application file for complete search history.

(56) References Cited

U.S. PATENT DOCUMENTS

| | | | |
|---|---|---|---|
| 2013/0308465 A1* | 11/2013 | Xu | H04W 76/28 370/241 |
| 2015/0271870 A1* | 9/2015 | Agiwal | H04W 76/14 370/311 |
| 2018/0352511 A1* | 12/2018 | Martin | H04W 52/0229 |
| 2023/0014303 A1* | 1/2023 | Di Girolamo | H04W 72/20 |

* cited by examiner

*Primary Examiner* — Christopher M Crutchfield
*Assistant Examiner* — Jean F Voltaire
(74) *Attorney, Agent, or Firm* — Holland & Hart LLP/Qualcomm Incorporated

(57) ABSTRACT

Methods, systems, and devices for wireless communication are described related to timer-based sidelink discontinuous reception (DRX). A UE may receive configuration information for a sidelink DRX mode from a base station or another UE, which may indicate one or more parameters of the sidelink DRX mode. When operating in the sidelink DRX mode, a group of UEs may have shared active durations and inactive durations for coordinating sidelink communications. In a timer-based sidelink DRX mode, if a UE receives or transmits a sidelink communication, the UE may initiate an inactivity timer, and the UE may continue to monitor a sidelink channel for other sidelink communications while the timer is running. One or more rules may govern the operation of an inactivity timer with respect to the shared inactive durations.

28 Claims, 20 Drawing Sheets

… (1)

TIMER-BASED DISCONTINUOUS RECEPTION FOR SIDELINK COMMUNICATIONS

FIELD OF TECHNOLOGY

The following relates to wireless communication, including timer-based discontinuous reception (DRX) for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may communicate with one or more other UEs via sidelink communications (e.g., without communicating via a base station). In some cases, sidelink traffic may be discontinuous (e.g., intermittent).

SUMMARY

The described techniques relate to improved methods, systems, devices, and apparatuses that support timer-based discontinuous reception (DRX) for sidelink communications. For example, in a sidelink DRX mode, a group of two or more user equipments (UEs) may be configured with common active durations and common inactive durations, where an active duration and an inactive duration that are adjacent in time (e.g., one is immediately subsequent to the other) may collectively represent one DRX cycle. In some cases, a UE may be configured to send or receive sidelink communications (where a sidelink communication may refer to a message either sent or received by the UE) during certain portions of an active duration, and such portions may be referred to as monitoring occasions.

As described herein, a sidelink DRX mode may be a timer-based sidelink DRX mode, in which an inactivity timer at least partially governs when a UE is to actively monitor for sidelink communications while the UE is operating in the sidelink DRX mode. For example, if the UE receives or transmits a sidelink communication within an active duration (e.g., within a monitoring occasion for the UE during the active duration), the UE may initiate an inactivity timer (e.g., as indicated by the sidelink DRX configuration). While the timer is running, the UE may continue to monitor the sidelink channel for other sidelink communications, though such monitoring may be subject to one or more rules as described herein (e.g., rules related to when the timer remains running at the commencement of an inactive duration).

A UE may receive configuration information for the sidelink DRX mode, which may indicate one or more parameters of the sidelink DRX mode (e.g., a duration for the inactivity timer). The UE may receive the configuration information from another UE or from a base station. In the sidelink DRX mode, a transmitting UE and a receiving UE may have at least partially aligned monitoring occasions, such that transmission and reception of sidelink communications may take place in a coordinated manner. In some cases, a first UE may serve as a relay for a second UE, such that the first UE may receive a message from a base station and send the message or a corresponding message to the second UE via the sidelink, where the monitoring occasions of the first UE may be aligned with the monitoring occasions of the second UE (e.g., in advance, or on an on-demand basis).

A method for wireless communication at a first UE of a group of UEs is described. The method may include receiving configuration information for a sidelink DRX mode that corresponds to one or more active durations shared by the group of UEs and one or more inactive durations shared by the group of UEs, where the configuration information indicates a duration of a timer, transmitting or receiving, to or from another UE of the group of UEs, a sidelink communication during an active duration of the one or more active durations, initiating the timer based on transmitting or receiving the sidelink communication during the active duration, and monitoring a sidelink channel associated with the group of UEs after initiating the timer and for a time period based on the duration of the timer.

An apparatus for wireless communication at a first UE of a group of UEs is described. The apparatus may include a processor, memory coupled with the processor, and instructions stored in the memory. The instructions may be executable by the processor to cause the apparatus to receive configuration information for a sidelink DRX mode that corresponds to one or more active durations shared by the group of UEs and one or more inactive durations shared by the group of UEs, where the configuration information indicates a duration of a timer, transmit or receive, to or from another UE of the group of UEs, a sidelink communication during an active duration of the one or more active durations, initiate the timer based on transmitting or receiving the sidelink communication during the active duration, and monitor a sidelink channel associated with the group of UEs after initiating the timer and for a time period based on the duration of the timer.

Another apparatus for wireless communication at a first UE of a group of UEs is described. The apparatus may include means for receiving configuration information for a sidelink DRX mode that corresponds to one or more active durations shared by the group of UEs and one or more inactive durations shared by the group of UEs, where the configuration information indicates a duration of a timer, means for transmitting or receiving, to or from another UE of the group of UEs, a sidelink communication during an active duration of the one or more active durations, means for initiating the timer based on transmitting or receiving the sidelink communication during the active duration, and means for monitoring a sidelink channel associated with the group of UEs after initiating the timer and for a time period based on the duration of the timer.

A non-transitory computer-readable medium storing code for wireless communication at a first UE of a group of UEs is described. The code may include instructions executable by a processor to receive configuration information for a sidelink DRX mode that corresponds to one or more active durations shared by the group of UEs and one or more inactive durations shared by the group of UEs, where the configuration information indicates a duration of a timer, transmit or receive, to or from another UE of the group of UEs, a sidelink communication during an active duration of the one or more active durations, initiate the timer based on transmitting or receiving the sidelink communication during the active duration, and monitor a sidelink channel associated with the group of UEs after initiating the timer and for a time period based on the duration of the timer.

In some examples of the method, apparatuses, and non-transitory computer-readable medium described herein, monitoring for the one or more additional sidelink communications may include operations, features, means, or instructions for monitoring the sidelink channel during at least a portion of a first inactive duration of the one or more inactive durations based on a value of the timer, at a beginning of the first inactive duration, being less than the duration of the timer.

Some examples of the method, apparatuses, and non-transitory computer-readable medium described herein may further include operations, features, means, or instructions for pausing the timer based on a value of the timer, at a beginning of a first inactive duration of the one or more inactive durations, being less than the duration of the timer, refraining from monitoring the sidelink channel during the first inactive duration, and restarting the timer based on a beginning of a second active duration of the one or more active durations, the second active duration, where monitoring the sidelink channel includes monitoring the sidelink channel during at least a portion of the second active duration based on restarting the timer at the beginning of the second active duration.

Some examples of the method, apparatuses, and non-transitory computer-readable medium described herein may further include operations, features, means, or instructions for terminating the timer based on a beginning of a first inactive duration of the one or more inactive durations, where a value of the timer at the beginning of the first inactive duration may be less than the duration of the timer and refraining from monitoring the sidelink channel during the first inactive duration.

Some examples of the method, apparatuses, and non-transitory computer-readable medium described herein may further include operations, features, means, or instructions for terminating the timer, during the active duration or a second active duration of the one or more active duration, based on a value of the timer reaching the duration of the timer and refraining from monitoring, based on terminating the timer, for sidelink communications during a portion of the active duration or a portion of the second active duration.

In some examples of the method, apparatuses, and non-transitory computer-readable medium described herein, each of the one or more active durations includes one or more monitoring occasions for the first UE and the method, apparatuses, and non-transitory computer-readable medium may include further operations, features, means, or instructions for monitoring, after the portion of the active duration or the portion of the second active duration, for the one or more additional sidelink communications during a second monitoring occasion for the first UE.

Some examples of the method, apparatuses, and non-transitory computer-readable medium described herein may further include operations, features, means, or instructions for transmitting or receiving, to or from the second UE or a third UE of the group of UEs, a second sidelink communication before a value of the timer reaches the duration of the timer, reinitiating the timer based on transmitting or receiving the second sidelink communication before the value of the timer reaches the duration of the timer, and continuing to monitor the sidelink channel after reinitiating the timer and for a time period based on the duration of the timer.

Some examples of the method, apparatuses, and non-transitory computer-readable medium described herein may further include operations, features, means, or instructions for initiating a second timer based on entering a second active duration of the one or more active durations after a first inactive duration of the one or more inactive durations, where the configuration information indicates a second duration of the second timer, refraining from monitoring, after initiating the second timer and for a time period based on the second duration of the second timer, the sidelink channel during a first portion of the second active duration, and monitoring the sidelink channel during a second portion of the second active duration based on a value of the second timer reaching the second duration, the second portion after the first portion.

In some examples of the method, apparatuses, and non-transitory computer-readable medium described herein, receiving the configuration information may include operations, features, means, or instructions for receiving the configuration information from a base station.

In some examples of the method, apparatuses, and non-transitory computer-readable medium described herein, receiving the configuration information may include operations, features, means, or instructions for receiving the configuration information from a second UE of the group of UEs.

Some examples of the method, apparatuses, and non-transitory computer-readable medium described herein may further include operations, features, means, or instructions for transmitting an indication of one or more preferences for the sidelink DRX mode, where receiving the configuration information may be based on transmitting the indication of the one or more preferences.

In some examples of the method, apparatuses, and non-transitory computer-readable medium described herein, the group of UEs may be associated with a first service and a second group of UEs may be associated with a second service and the one or more active durations include a first set of monitoring occasions for the group of UEs that at least partially overlaps in time with a second set of monitoring occasions for the second set of UEs.

Some examples of the method, apparatuses, and non-transitory computer-readable medium described herein may further include operations, features, means, or instructions for receiving, during a first monitoring occasion for the first UE within a first active duration of the one or more active durations, a message from a second UE of the group of UEs via the sidelink channel, the first monitoring occasion for the first UE at least partially overlapping in time with a second monitoring occasion for the second UE within the first active duration.

Some examples of the method, apparatuses, and non-transitory computer-readable medium described herein may further include operations, features, means, or instructions for identifying a first set of monitoring occasions for the first UE within a first active duration of the one or more active durations, receiving, from a base station, a first message corresponding to a second message for a second UE of the group of UEs, and transmitting the second message to the second group of the UEs via the sidelink channel during a monitoring occasion for the second UE within the first active duration, where transmitting the second message occurs outside of the first set of monitoring occasions for the first UE.

A method for wireless communication at a first UE of a group of UEs is described. The method may include transmitting, to a second UE of the group of UEs, configuration information for a sidelink DRX mode, where the sidelink DRX mode corresponds to one or more active durations shared by the group of UEs and one or more inactive durations shared by the group of UEs, and where the configuration information indicates a duration of a timer for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

An apparatus for wireless communication at a first UE of a group of UEs is described. The apparatus may include a processor, memory coupled with the processor, and instructions stored in the memory. The instructions may be executable by the processor to cause the apparatus to transmit, to a second UE of the group of UEs, configuration information for a sidelink DRX mode, where the sidelink DRX mode correspond to one or more active durations shared by the group of UEs and one or more inactive durations shared by the group of UEs, and where the configuration information indicate a duration of a timer for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

Another apparatus for wireless communication at a first UE of a group of UEs is described. The apparatus may include means for transmitting, to a second UE of the group of UEs, configuration information for a sidelink DRX mode, means for where the sidelink DRX mode corresponds to one or more active durations shared by the group of UEs and one or more inactive durations shared by the group of UEs, and means for where the configuration information indicates a duration of a timer for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

A non-transitory computer-readable medium storing code for wireless communication at a first UE of a group of UEs is described. The code may include instructions executable by a processor to transmit, to a second UE of the group of UEs, configuration information for a sidelink DRX mode, where the sidelink DRX mode correspond to one or more active durations shared by the group of UEs and one or more inactive durations shared by the group of UEs, and where the configuration information indicate a duration of a timer for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

Some examples of the method, apparatuses, and non-transitory computer-readable medium described herein may further include operations, features, means, or instructions for determining the configuration information based on the first UE being the group leader, where transmitting the configuration information may be based on determining the configuration information.

Some examples of the method, apparatuses, and non-transitory computer-readable medium described herein may further include operations, features, means, or instructions for receiving, from a base station, an indication of a set of sidelink discontinuous mode configurations and determining the configuration information based on selecting a sidelink discontinuous mode configuration from the set of sidelink discontinuous mode configurations, where transmitting the configuration information may be based on determining the configuration information.

Some examples of the method, apparatuses, and non-transitory computer-readable medium described herein may further include operations, features, means, or instructions for receiving the configuration information from a base station, where transmitting the configuration information to the second UE may be based on receiving the configuration information from the base station.

Some examples of the method, apparatuses, and non-transitory computer-readable medium described herein may further include operations, features, means, or instructions for receiving, from a base station, a first message corresponding to a second message for the second UE and transmitting, based on receiving the first message, the second message to the second UE via the sidelink channel during a monitoring occasion for the second UE within the one or more active durations.

Some examples of the method, apparatuses, and non-transitory computer-readable medium described herein may further include operations, features, means, or instructions for receiving, from the base station within the first message, an indication of the monitoring occasion for the second UE, where the monitoring occasion for the second UE may be independent of a second monitoring occasion associated with the first UE.

Some examples of the method, apparatuses, and non-transitory computer-readable medium described herein may further include operations, features, means, or instructions for receiving an indication of the monitoring occasion for the second UE prior to receiving the first message, where the monitoring occasion may be independent of a second monitoring occasion for the first UE.

In some examples of the method, apparatuses, and non-transitory computer-readable medium described herein, the monitoring occasion for the second UE at least partially overlaps in time with a second monitoring occasion for the first UE within the one or more active durations.

A method for wireless communication at a base station is described. The method may include transmitting, to a first UE of a group of UEs, configuration information for a sidelink DRX mode, where the sidelink DRX mode corresponds to one or more active durations shared by the group of UEs and one or more inactive durations shared by the group of UEs, and where the configuration information indicates a duration of a timer for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

An apparatus for wireless communication at a base station is described. The apparatus may include a processor, memory coupled with the processor, and instructions stored in the memory. The instructions may be executable by the processor to cause the apparatus to transmit, to a first UE of a group of UEs, configuration information for a sidelink DRX mode, where the sidelink DRX mode correspond to one or more active durations shared by the group of UEs and one or more inactive durations shared by the group of UEs, and where the configuration information indicate a duration of a timer for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

Another apparatus for wireless communication at a base station is described. The apparatus may include means for transmitting, to a first UE of a group of UEs, configuration information for a sidelink DRX mode, means for where the sidelink DRX mode corresponds to one or more active durations shared by the group of UEs and one or more inactive durations shared by the group of UEs, and means for where the configuration information indicates a duration of a timer for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

A non-transitory computer-readable medium storing code for wireless communication at a base station is described. The code may include instructions executable by a processor to transmit, to a first UE of a group of UEs, configuration information for a sidelink DRX mode, where the sidelink DRX mode correspond to one or more active durations shared by the group of UEs and one or more inactive durations shared by the group of UEs, and where the configuration information indicate a duration of a timer for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

In some examples of the method, apparatuses, and non-transitory computer-readable medium described herein, transmitting the configuration information may include operations, features, means, or instructions for transmitting the configuration information for the first UE to a second UE of the group of UEs for relaying to the first UE.

Some examples of the method, apparatuses, and non-transitory computer-readable medium described herein may further include operations, features, means, or instructions for transmitting a first message to a second UE of the group of UEs, the first message for the second UE to transmit a corresponding second message to the first UE via the sidelink channel.

Some examples of the method, apparatuses, and non-transitory computer-readable medium described herein may further include operations, features, means, or instructions for transmitting, to the second UE, an indication of a monitoring occasion associated with the first UE for the sidelink channel, where the monitoring occasion may be independent of a second monitoring occasion associated with the second UE for the sidelink channel.

DETAILED DESCRIPTION

Figure 1:
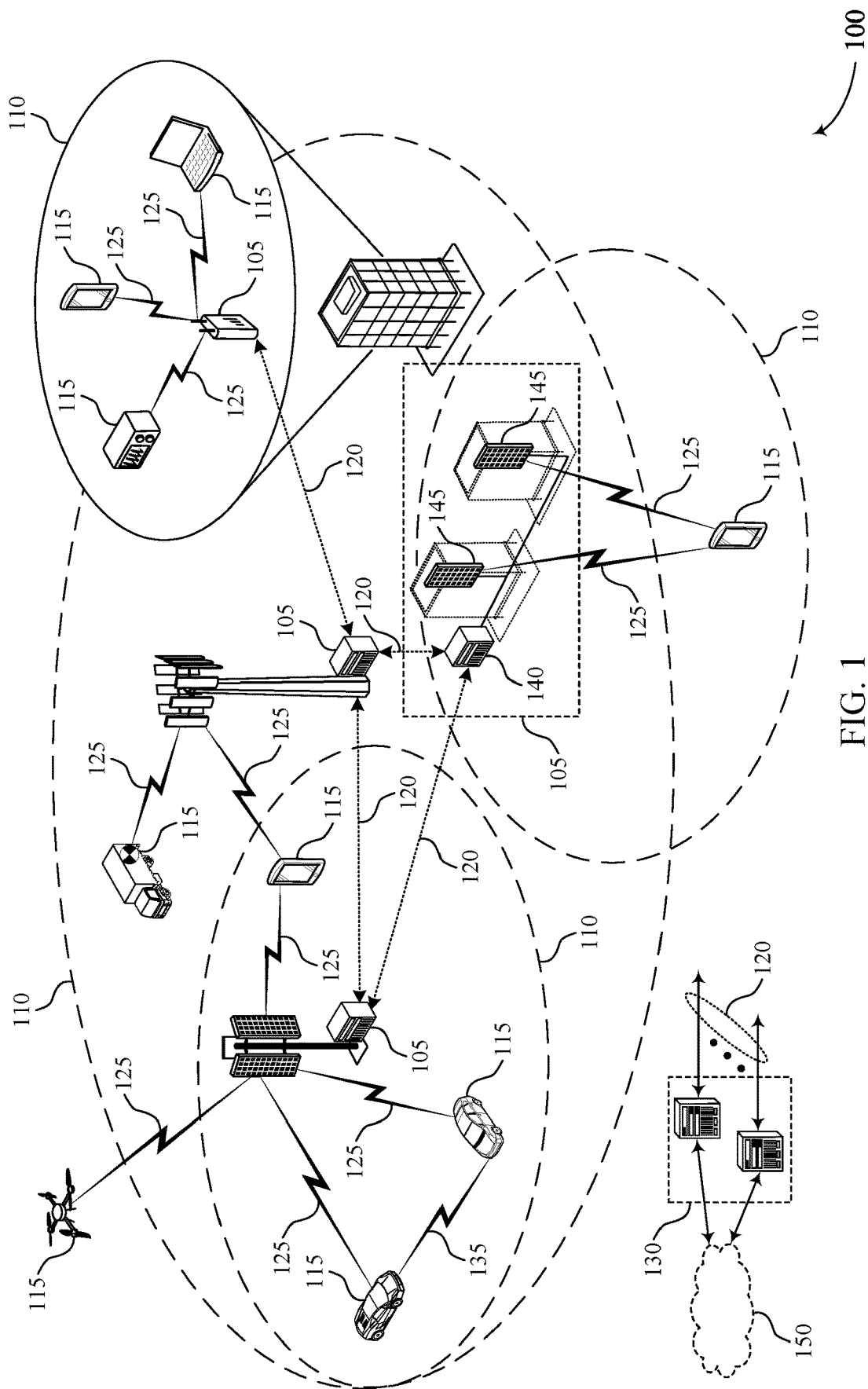
FIG. 1 illustrates an example of a wireless communications system that supports timer-based discontinuous reception (DRX) for sidelink communications in accordance with aspects of the present disclosure.

In some cases, one or more user equipments (UEs) may each communicate with each other via respective sidelink communication links (e.g., may directly communicate with each other, without communicating via a base station), where a sidelink communication link may include one or more sidelink channels (e.g., one or more sidelink control channels, one or more sidelink data or shared channels). In some cases, sidelink traffic may be discontinuous (e.g., intermittent). Thus, if a UE continuously monitors for sidelink communications, the UE may use power inefficiently (e.g., without detecting or communicating a corresponding amount of sidelink communications) and suffer from a relatively decreased battery life, among other possible drawbacks.

In order to reduce power consumption and increase battery life, a UE may be configured with a sidelink discontinuous reception (DRX) mode, for example, in order to intermittently monitor for sidelink communications. For example, in a sidelink DRX mode, a group of two or more user equipments (UEs) may be configured with common active durations and common inactive durations, where an active duration and an inactive duration that are adjacent in time (e.g., one is immediately subsequent to the other) may collectively represent one DRX cycle. In some cases, an active duration that is common to a group of two or more UEs may alternatively be referred to as a Common On duration, and an inactive duration that is common to a group of two or more UEs may alternatively be referred to as a Common Off duration.

In some cases, a UE may send or receive sidelink communications (where a sidelink communication may refer to message either sent or received by the UE) during certain portions of an active duration, and such portions may be referred to as monitoring occasions, or alternatively as active portions of an active duration. Thus, a UE may only be active (e.g., actively monitoring for communications, allowed to send communications, or both) during one or more portions of an active duration. The UE thus may be inactive during one or more other portions of the active duration, along with being inactive during inactive durations.

As described herein, the sidelink DRX mode may be a timer-based sidelink DRX mode, in which an inactivity timer at least partially controls when a UE is active while operating within the sidelink DRX mode. A UE may receive configuration information for the sidelink DRX mode, which may indicate one or more parameters of the sidelink DRX mode, such as a duration of the inactivity timer, among other examples. The UE may receive the configuration information from another UE or from a base station.

Based on the configuration information, the UE may enter a corresponding sidelink DRX mode and may perform communication techniques in the sidelink DRX mode based on one or more parameters of the sidelink DRX configuration. In the sidelink DRX mode, a transmitting UE and a receiving UE may have at least partially aligned monitoring occasions (e.g., may be included in a group of two or more UEs with at least be partially aligned monitoring occasions), such that transmission and reception of sidelink communications may take place in a coordinated manner. A UE may periodically monitor for sidelink communications, for example, during one or more monitoring occasions within an active duration, where the active duration that is shared by a group of UEs that includes the UE.

In a timer-based sidelink DRX mode as described herein, if the UE receives or transmits a sidelink communication within the active duration (e.g., within a monitoring occasion therein), the UE may initiate an inactivity timer (e.g., as indicated by the sidelink DRX configuration). While the timer is running, the UE generally may continue to monitor the sidelink channel for other sidelink communications, though this may be subject to one or more rules related to operation during inactive durations. For instance, as a first example, if the inactivity timer is still running at the beginning of an inactive duration, the UE may continue monitoring for sidelink communications during the inactive duration until the timer expires. As a second example, if the inactivity timer is still running at the beginning of an inactive duration, the UE may pause the inactivity timer and stop monitoring the sidelink channel until the inactive duration is over, and the UE may resume monitoring the sidelink channel during a next active duration for a remaining duration of the inactivity timer (e.g., until the timer expires). As a third example, if the inactivity timer is still running at the beginning of an inactive duration, the UE may terminate the inactivity timer (e.g., even if the timer is not yet expired) and may not resume the timer or associated monitoring upon entering a next active duration—e.g., any monitoring or other activity of the UE during the next active duration may be independent of the inactivity timer's status as of the end of the prior active duration.

In some cases, within the active durations, the default monitoring occasions of a UE may be configured to be fully or partially aligned with monitoring occasions of one or more other UEs, such as one or more UEs associated with a same service, or one or more UEs that may relay transmissions to the UE. In some cases, however, the default monitoring occasions of a relay UE may not be configured to be aligned with (e.g., may be independent of) monitoring occasions of a target UE, but the relay UE may be informed of a monitoring occasion of the target UE, and the relay UE may become active as needed (e.g., outside of the default monitoring occasions of the relay UE) in order to forward communications to the target UE.

Aspects of the disclosure are initially described in the context of wireless communications systems. Aspects of the disclosure are further illustrated by and described with reference to DRX configurations, process flows, apparatus diagrams, system diagrams, and flowcharts that relate to timer-based DRX for sidelink communications.

FIG. 1 illustrates an example of a wireless communications system 100 that supports timer-based DRX for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive configuration information for a sidelink DRX mode, which may indicate one or more parameters of the sidelink DRX mode. The UE 115 may receive the configuration information from another UE 115 or from a base station 105. In the sidelink DRX mode, a transmitting UE 115 and a receiving UE 115 may have at least partially aligned monitoring occasions, such that transmission and reception of sidelink communications may take place in a coordinated manner. In a timer-based sidelink DRX mode, a UE 115 may periodically monitor for sidelink communications, for example, during one or more monitoring occasions of an active duration that is shared by a group of sidelink UEs 115.

If the UE 115 receives or transmits a sidelink communication within the active duration (e.g., within a monitoring occasion of the active duration), the UE 115 may initiate an inactivity timer (e.g., as indicated by the sidelink DRX configuration). While the timer is running, the UE 115 may continue to monitor the sidelink channel for other sidelink communications (e.g., even if the timer extends out of a monitoring occasion within the active duration), subject to one or more rules related to inactive durations of the sidelink DRX cycles. For instance, as a first example, if the inactivity timer is still running at the beginning of an inactive duration, the UE 115 may continue monitoring for sidelink communications during the inactive duration until the timer expires. As a second example, if the inactivity timer is still running at the beginning of an inactive duration, the UE 115 may pause the inactivity timer and stop monitoring the sidelink channel throughout the inactive duration, and the UE 115 may resume monitoring the sidelink channel during a next active duration for a remaining duration of the inactivity timer (e.g., until the timer expires). As a third example, if the inactivity timer is still running at the beginning of an inactive duration, the UE 115 may terminate the inactivity timer based upon entering the inactive duration (e.g., even if the timer is not yet expired) and may not resume the inactivity timer or associated monitoring upon entering a next active duration—e.g., any use of the inactivity timer during the next active duration may be independent of any use of the inactivity time during the preceding active duration.

Figure 2:
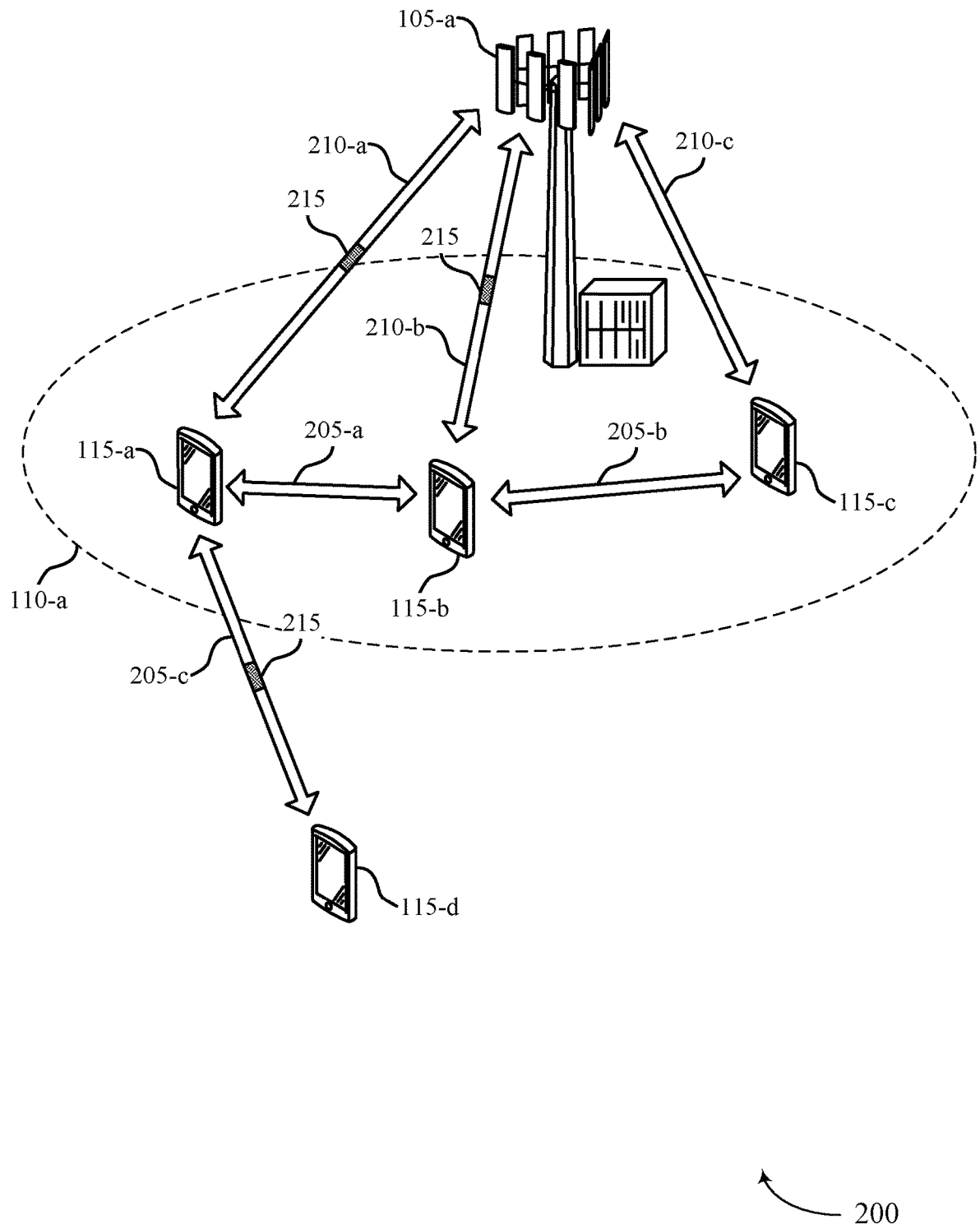
FIG. 2 illustrates an example of a wireless communications system that supports timer-based DRX for sidelink communications in accordance with aspects of the present disclosure.

FIG. 2 illustrates an example of a wireless communications system 200 that supports timer-based DRX for sidelink communications in accordance with aspects of the present disclosure. In some examples, wireless communications system 200 may implement some aspects of wireless communications system 100. For example, wireless communications system 200 may include a base station 105-a and UEs 115-*a*, 115-*b*, 115-*c*, and 115-*d*, which may represent respective examples of a base station 105 and UEs 115 described with reference to FIG. 1. In some cases, one or more UEs 115 may each communicate with base station 105-*a* via a respective communication link 210 (e.g., a Uu link). For example, UEs 115-*a*, 115-*b*, and 115-*c* (e.g., within a coverage area 110-*a* of base station 105-*a*) may communicate with base station 105-*a* via communication links 210-*a*, 210-*b*, and 210-*c*, respectively.

UEs 115 may also communicate with each other via respective sidelink communication links 205 (e.g., directly communicate with each other, without communicating via a base station 105). For example, UEs 115-*a* and 115-*b* may communicate with each other via sidelink link 205-*a*, UEs 115-*b* and 115-*c* may communicate with each other via sidelink link 205-*b*, and UEs 115-*a* and 115-*d* may communicate with each other via sidelink link 205-*c*.

In some cases, in order to reduce power consumption and increase battery life, among other benefits that may be appreciated by one of ordinary skill in the art, a UE 115 may be configured with a sidelink DRX mode as described herein. In the sidelink DRX mode, the UE 115 may go to sleep or enter a sleep state (e.g., periodically, such as in some slots or TTIs) if there is no sidelink traffic to monitor or on some other scheduled basis, where entering the sleep state may represent a state in which the UE 115 may refrain from monitoring a sidelink channel (e.g., a physical sidelink shared channel (PSSCH)).

The sidelink DRX mode may be a timer-based sidelink DRX mode (e.g., in a sidelink radio resource control (RRC) connected mode), in which an inactivity timer at least partially controls when the UE is to actively monitor for sidelink communications (e.g., within the sidelink DRX mode). The timer-based sidelink DRX mode may apply to sidelink communications that include data or control transmissions, as well as sidelink communications that include one or more paging messages. A UE 115 may receive configuration information 215 for the sidelink DRX mode, which may indicate one or more parameters of the sidelink DRX mode. The UE 115 may receive the configuration information 215 from another UE 115 or from a base station 105. For example, UE 115-*a* or UE 115-*b*, or both, may receive configuration information 215 from base station 105-*a* (e.g., via a communication link 210). Additionally or alternatively, UE 115-*d* may receive configuration information 215 from UE 115-*a* (e.g., directly from UE 115-*a* or forwarded from base station 105-*a*).

Based on the configuration information 215, a UE 115 may enter a corresponding sidelink DRX mode and may perform communication techniques in the sidelink DRX mode based on one or more parameters of the sidelink DRX configuration. In the sidelink DRX mode, the UE 115 may refrain from interrupting a sleep state to transmit or receive information (e.g., sidelink communications or transmissions). For example, a transmitting UE 115 (e.g., source UE 115) and a receiving UE 115 (e.g., destination UE 115) may have at least partially aligned monitoring occasions (e.g., which may also be at least partially aligned with one or more other UEs 115), such that transmission and reception of sidelink communications may take place in a coordinated manner. In some examples, if a UE 115 were to transmit during a sleep state (e.g., interrupt the sleep state to transmit), a receiving UE 115 (e.g., destination UE 115) may be in a sleep state and may refrain from monitoring for the transmission (e.g., refrain from monitoring a PSSCH or other sidelink channel).

In a timer-based sidelink DRX mode, a UE 115 may periodically monitor for sidelink communications, for example, during one or more monitoring occasions of an active duration (e.g., a "Common On" duration) that is shared by a group of sidelink UEs 115. If the UE 115 receives or transmits a sidelink communication within the active duration (e.g., within a monitoring occasion of the active duration), the UE may initiate an inactivity timer (e.g., as indicated by the sidelink DRX configuration). While the timer is running, the UE 115 may continue to monitor the sidelink channel for other sidelink communications (e.g., even if the timer extends out of a monitoring occasion of the active duration).

In a first example, if the inactivity timer is still running, the UE 115 may continue monitoring for sidelink communications during an inactive duration of the sidelink DRX mode (e.g., a "Common Off" duration) shared by the group of UEs 115. In a second example, if the inactivity timer is still running, the UE 115 may pause the inactivity timer, stop monitoring the sidelink channel during the inactive duration, and resume monitoring during a next active duration for a remaining duration of the inactivity timer. In a third example, if the inactivity timer is still running, the UE 115 may terminate the inactivity timer when entering an inactive duration (e.g., even if the timer is not yet expired) and may not resume the timer or associated monitoring upon entering a next active duration.

In some cases, within the active durations, monitoring occasions of a UE 115 may be fully or partially aligned with monitoring occasions of one or more other UEs 115, such as one or more UEs 115 associated with a same service, or one or more UEs 115 (e.g., relay UEs 115, such as UE 115-*a*) that may relay transmissions to the UE 115. In some cases, the monitoring occasions of the UE 115 may not be aligned with (e.g., may be independent of) monitoring occasions of relay UE(s) 115, in which cases the relay UE(s) 115 may be aware of the monitoring occasions of the UE 115 (e.g., in order to forward communications to the UE 115).

Figure 3:
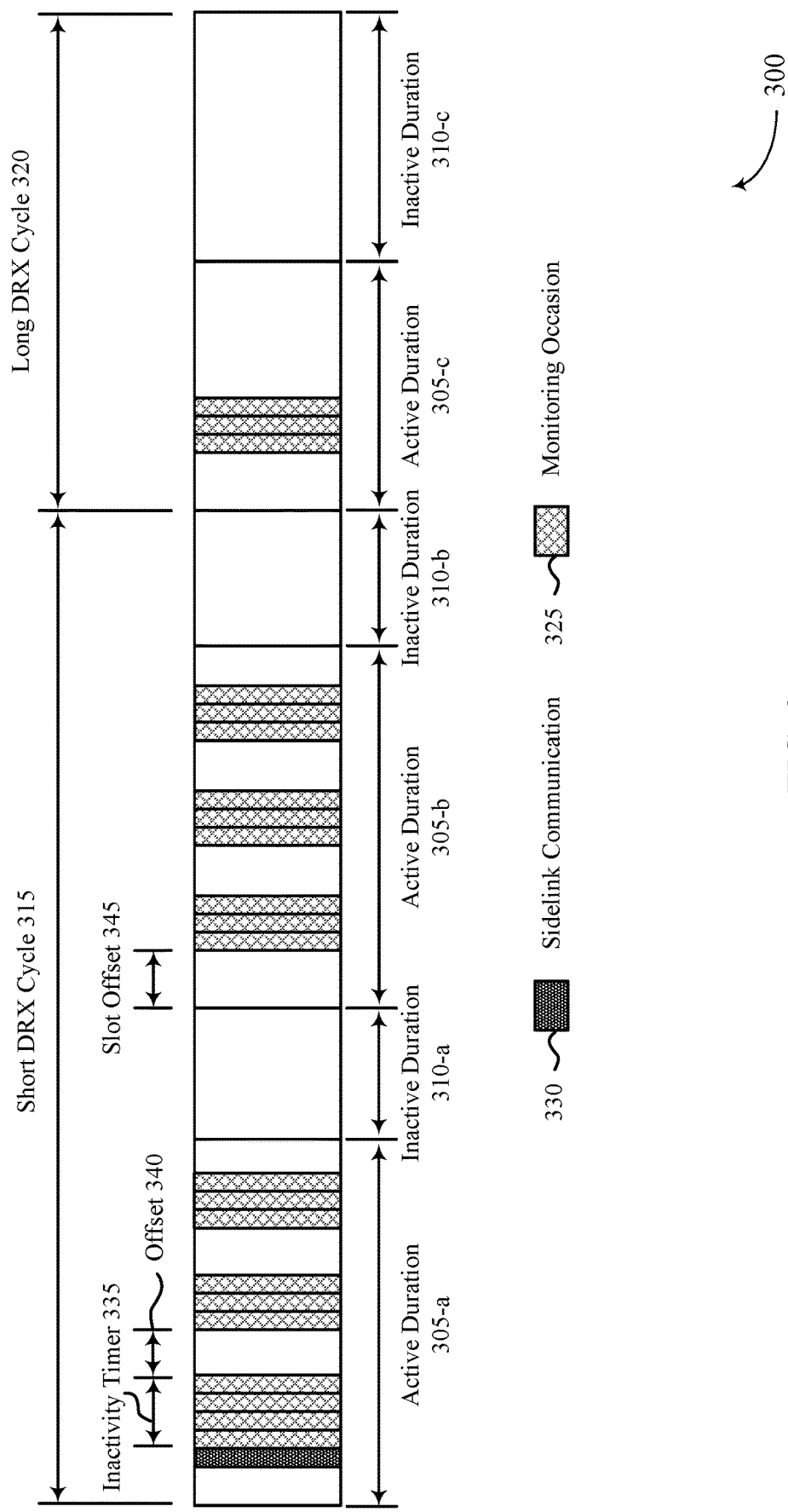
FIG. 3 illustrates an example of a DRX configuration that supports timer-based DRX for sidelink communications in accordance with aspects of the present disclosure.

FIG. 3 illustrates an example of a DRX configuration 300 that supports timer-based DRX for sidelink communications in accordance with aspects of the present disclosure. DRX configuration 300 may implement or be implemented by some aspects of wireless communications system 100 or 200. For example, DRX configuration 300 may represent a sidelink DRX configuration and may be implemented by a UE 115 to determine to monitor or refrain from monitoring a sidelink channel (e.g., for one or more sidelink communications 330), where the UE 115 may represent an example of a UE 115 described with reference to FIGS. 1 and 2.

As described with reference to FIG. 2, the sidelink DRX configuration may be associated with active durations 305 and inactive durations 310, where the active durations 305 and inactive durations 310 may be shared by at least a group of UEs 115 that includes the UE 115. The active durations 305 and inactive durations 310 may be preconfigured at the UE 115, or may be configured by the network. Each active duration 305 may include one or more monitoring occasions 325, which may each span one or more slots or TTIs. A monitoring occasion 325 may alternatively be referred to as an active time, and may represent a time duration during which the UE 115 monitors the sidelink channel for sidelink communications from other UEs 115. A monitoring occasion 325 may begin a time period after a beginning an active duration 305, which may be represented by a slot offset 345 (e.g., a sl-drx-Slot-Offset parameter). At the beginning of a monitoring occasion 325, the UE 115 may perform beam management (e.g., beam sweeping to find a beam).

If a sidelink communication 330 is received during an active duration 305 (e.g., during a monitoring occasion 325), the UE 115 may start (e.g., or restart) an inactivity timer 335 (e.g., a sl-drx-InactivityTimer parameter), for example, after a transmission on the sidelink channel finishes (e.g., after a data transmission on the PSSCH finishes). For example, the UE 115 may transmit or receive a sidelink communication 330 during active duration 305-a (e.g., within a monitoring occasion 325) and may start the inactivity timer 335. If the UE 115 receives the sidelink communication 330 (e.g., a sidelink message), the UE 115 may read or decode the contents of the message to determine a type of the message. Based on the content of the message, the UE 115 may distinguish the data from other signaling and start the inactivity timer 335 based on the distinguishing. For example, after reception of sidelink control information (SCI) (e.g., SCI-2) on a sidelink control channel (e.g., a physical sidelink control channel (PSCCH)), and if a destination identifier (ID) matches an ID of the UE 115 (e.g., a layer 2 (L2) ID), the UE 115 may read the message on the PSSCH. If the content of the message is regular data (e.g., is not PSSCH control or configuration information), the inactivity timer 335 may be triggered. In some cases, if the sidelink communication 330 is control signaling (e.g., instead of data) the inactivity timer 335 may not be started or restarted.

The inactivity timer 335 may specify a time duration for which the UE 115 monitors the sidelink channel (e.g., remains on) after receiving or transmitting a sidelink communication 330. When the inactivity timer 335 is on, the UE 115 may monitor the sidelink channel (e.g., may remain in an on state), which may extend a monitoring occasion 325 into an off period (e.g., non-monitoring period) of the active duration 305. The UE 115 may remain active, for example, for potential reception or transmission of a sidelink communication 330.

After the inactivity timer 335 expires, the UE 115 may enter a short DRX cycle 315 (e.g., a short sidelink DRX cycle, if the UE 115 is configured with a short sidelink DRX cycle) or a long DRX cycle 320 (e.g., a long sidelink DRX cycle, if the UE 115 is not configured with a short DRX cycle). In the short DRX cycle 315, an interval or time period between two monitoring occasions 325 of a same active duration 305 (e.g., between two slots or TTIs during which the UE 115 is on, or monitoring the sidelink channel) may be represented by an offset 340 (e.g., a sl-drx-Short-Cycle parameter). The short DRX cycle 315 may span multiple active durations 305 (e.g., active durations 305-a and 305-b). The UE 115 may enter a long DRX cycle 320 after a duration (e.g., a sl-drx-ShortCycle Timer parameter) of short DRX cycles 315. In some cases, within a long DRX cycle 320, an interval between monitoring occasions 325 (e.g., between on slots or TTIs) may be multiple active durations 305 and/or inactive durations 310.

Configuration information (e.g., a SL-DRX-Config information element) for the sidelink DRX mode may be received from another UE 115 or a base station 105 (e.g., as described with reference to FIGS. 1 and 2). The configuration information may be associated with one or more pre-configured parameters that may be updated by RRC signaling (e.g., layer 1 (L1) or L2 signaling) from the other UE 115 or the base station 105. The configuration information may provide parameters for the operation of the sidelink DRX mode, which may include one or more of the parameters described herein. For example, the configuration information may include an indication of the inactivity timer 335, the offset 340, and the slot offset 345, among other parameters. The configuration information may also include a parameter indicating an amount of monitoring time (e.g., on time) for a DRX cycle (e.g., a sl-drx-onDurationTimer parameter), one or more timers indicating a duration before a retransmission grant is expected (e.g., a sl-drx-HARQ-RTT-TimerTX and/or sl-drx-HARQ-RTT-TimerRX parameter), one or more timers indicating a duration until a retransmission or a retransmission grant is received (e.g., a sl-drx-R etransmissionTimerTX and/or sl-drx-RetransmissionTimerRX parameter), and a parameter defining where a long DRX cycle 320 starts (e.g., a sl-drx-LongCycleStart-Offset parameter).

Figure 4A:
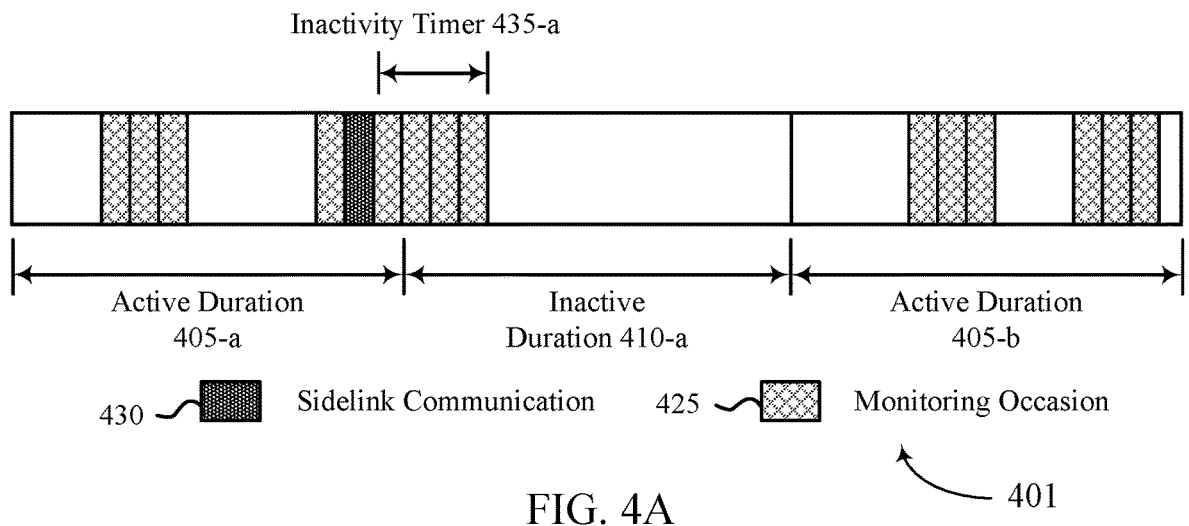
FIGS. 4A, 4B, and 4C illustrate examples of DRX configurations that support timer-based DRX for sidelink communications in accordance with aspects of the present disclosure.
Figure 4B:
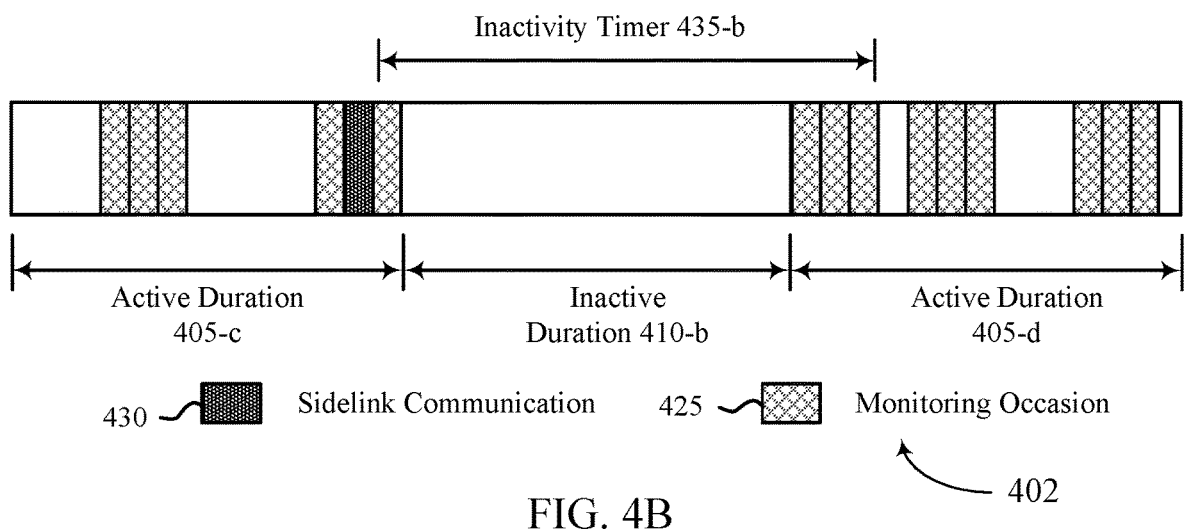
Figure 4C:
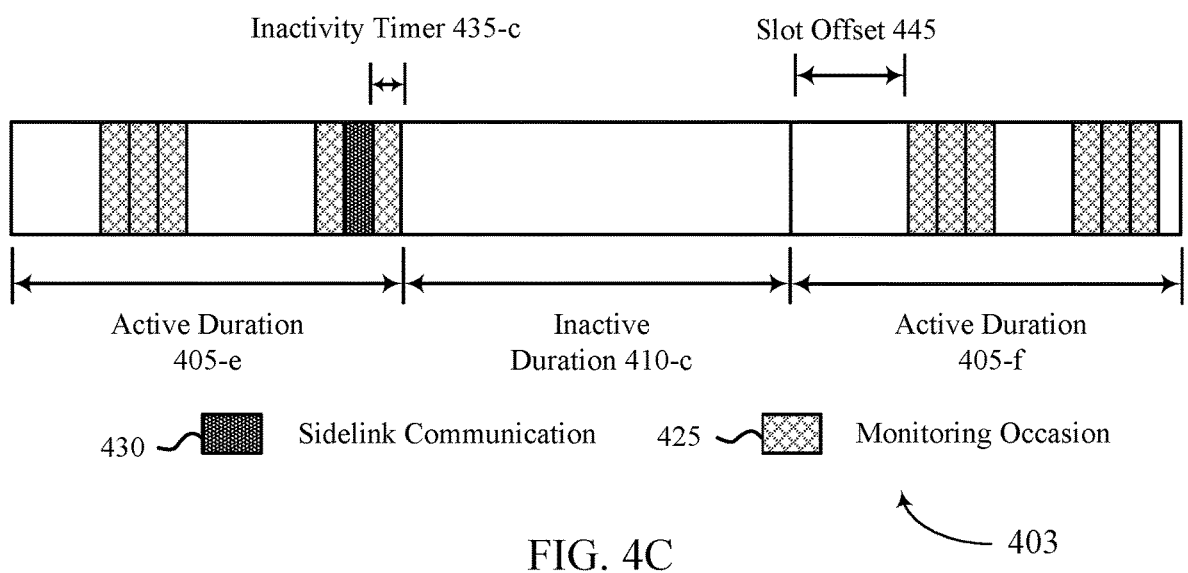

FIGS. 4A, 4B, and 4C illustrate examples of DRX configurations 401, 402, and 403 that support timer-based DRX for sidelink communications in accordance with aspects of the present disclosure. DRX configurations 401, 402, and 403 may implement or be implemented by some aspects of wireless communications system 100 or 200. For example, DRX configurations 401, 402, and 403 may represent a sidelink DRX configuration and may be implemented by a UE 115 to determine to monitor or refrain from monitoring a sidelink channel (e.g., for one or more sidelink communications 430), where the UE 115 may represent an example of a UE 115 described with reference to FIGS. 1-3.

DRX configurations 401, 402, and 403 may represent examples of configurations for managing an inactivity timer 435 when entering an inactive duration 410 of a sidelink DRX mode. As described with reference to FIG. 3, the inactivity timer 435 may start after reception of a sidelink communication 430 (e.g., a data transmission on a sidelink channel, such as a PSSCH) in an active duration 405 of a sidelink DRX mode.

In a first example, illustrated by FIG. 4A, an inactivity timer 435-a may extend into an inactive duration 410-a (e.g., a "Common Off" duration). The UE 115 may remain in active mode (e.g., may monitor the sidelink channel) while the inactivity timer is running, which may extend a monitoring occasion 425 into the inactive duration 410-a. When the inactivity timer 435-a expires (e.g., within the inactive duration 410-a), the UE 115 may go inactive (e.g., may refrain from monitoring the sidelink channel for a remainder of the inactive duration 410-a).

In a second example, illustrated by FIG. 4B, the UE 115 may pause an inactivity timer 435-b during an inactive duration 410-b. The inactivity timer 435-b may be paused, but may not be terminated, during the inactive duration 410-b. The UE 115 may go inactive (e.g., may refrain from monitoring the sidelink channel) at a beginning of the inactive duration 410-b and may remain inactive for a remainder of the inactive duration 410-b. The inactivity timer 435-b may be resumed at a beginning of a next active duration 405 (e.g., active duration 405-d), and the UE 115 may remain active (e.g., may monitor the sidelink channel, in a monitoring occasion 425) until the inactivity timer 435-b expires (e.g., within the active duration 405-d).

In a third example, illustrated by FIG. 4C, the UE 115 may terminate an activity timer 435-c at a beginning of an inactive duration 410-c (e.g., even if the inactivity timer 435-c would not otherwise have expired). The UE 115 may enter an inactive state (e.g., may refrain from monitoring the sidelink channel) at the beginning of the inactive duration 410-c. The UE 115 may begin its next monitoring occasion 425 (e.g., begin a next short or long DRX cycle) after a beginning of a next active duration 405-f independent of the value of the inactivity timer 435-c as of the beginning of the inactive duration 410-c (e.g., the UE 115 may begin its next monitoring occasion 425 a slot offset 445 after the beginning of the next active duration 405-*f*).

Figure 5A:
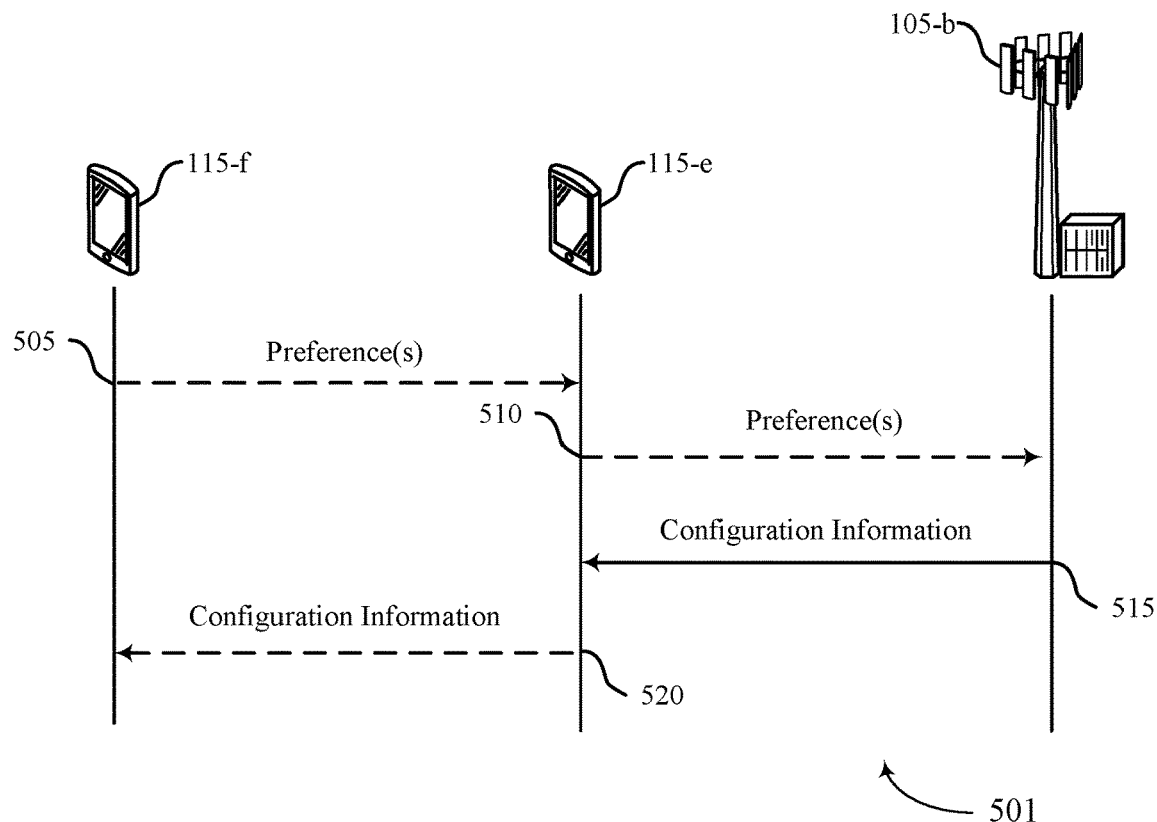
FIGS. 5A and 5B illustrate examples of process flows that support timer-based DRX for sidelink communications in accordance with aspects of the present disclosure.
Figure 5B:
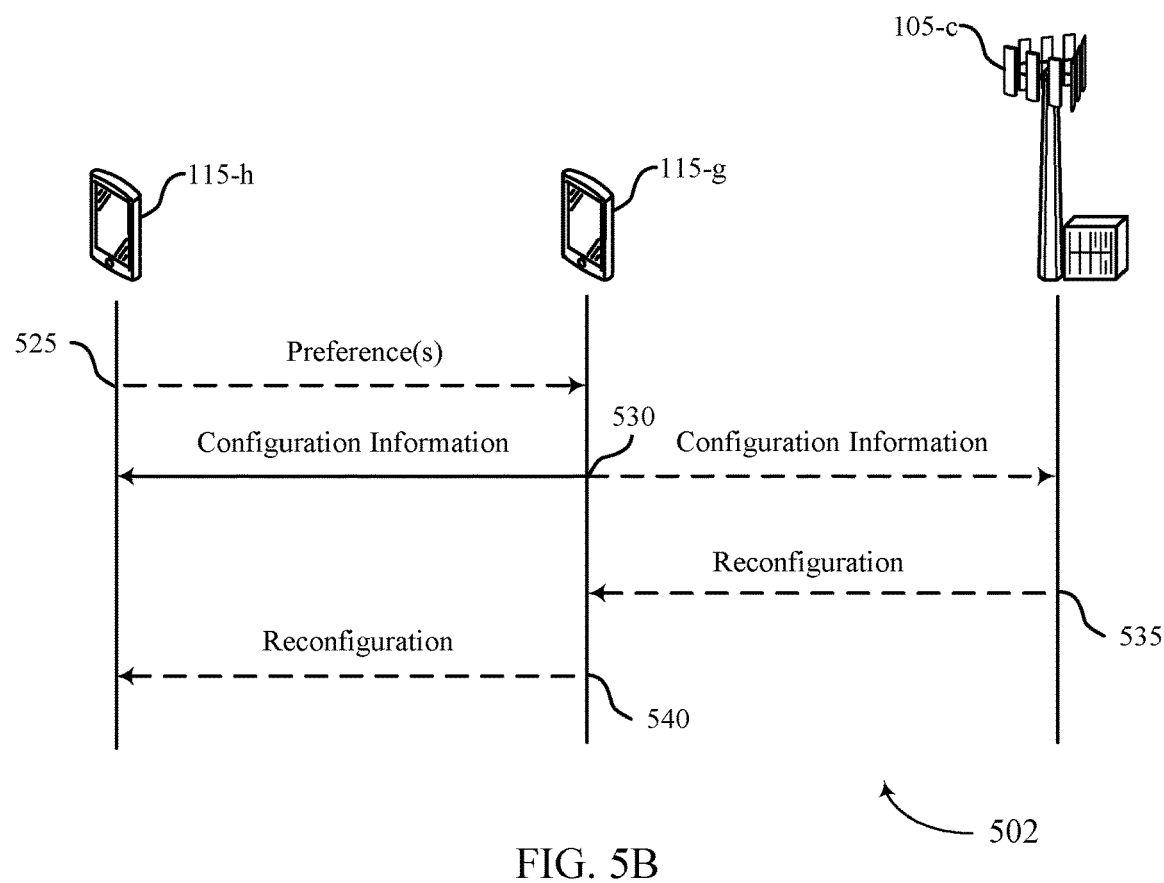

FIGS. 5A and 5B illustrate examples of process flows 501 and 502 that support timer-based DRX for sidelink communications in accordance with aspects of the present disclosure. Process flows 501 and 502 may implement or be implemented by some aspects of wireless communications system 100 or 200. For example, process flows 501 and 502 may illustrate techniques for signaling configuration information for a sidelink DRX mode to a UE 115, where the UE 115 may represent an example of a UE 115 described with reference to FIGS. 1-4. As described herein, the configuration information may be transmitted to the UE 115 from a base station 105 or another UE 115, where the base station 105 may represent an example of a base station 105 described with reference to FIGS. 1-4. The configuration information may be transmitted via RRC signaling (e.g., an SL-DRX-Config information element via a Uu interface or an SL-DRX-Config-sidelink via a sidelink or PC5 interface).

In a first example, illustrated by FIG. 5A, a UE 115-*e* may receive the configuration information from a base station 105-*b* (e.g., via a Uu interface). For example, base station 105-*b* may transmit the configuration information to UE 115-*e* at 515, as a unicast, groupcast, or broadcast transmission. The base station 105-*b* may store or have access to network information, which base station 105-*b* may use to optimize a sidelink DRX cycle for UE 115-*e* (e.g., based on the available information). In some cases, UE 115-*e* may transmit an indication of one or more sidelink DRX preferences to base station 105-*b*. For example, at 510, UE 115-*e* may transmit an indication of one or more sidelink DRX preferences to base station 105-*b*, and, in some cases, the configuration information may be based on the one or more preferences. The one or more preferences may indicate or otherwise be associated with any of the parameters described herein, for example, with reference to FIGS. 3 and 4.

In a second example illustrated by FIG. 5A, a UE 115-*f* may receive the configuration information from a base station 105-*b*, where the configuration information may be relayed from base station 105-*b*, via UE 115-*e*. For example, base station 105-*b* may transmit the configuration information to UE 115-*e* at 515, as a unicast, groupcast, or broadcast transmission, and UE 115-*e* may relay or transmit the configuration information to UE 115-*f* at 520. In such cases, the base station 105-*b* may store or have access to network information, which base station 105-*b* may use to optimize a sidelink DRX cycle for UE 115-*f* (e.g., based on the available information). In some cases, UE 115-*f* may transmit an indication of one or more sidelink DRX preferences to base station 105-*b* (e.g., via UE 115-*e*). For example, at 505, UE 115-*f* may transmit an indication of one or more sidelink DRX preferences to UE 115-*e* and UE 115-*e* may relay the one or more preferences to base station 105-*b*. In some cases, the configuration information may be based on the one or more preferences. The one or more preferences may indicate or otherwise be associated with any of the parameters described herein, for example, with reference to FIGS. 3 and 4.

In a third example, illustrated by FIG. 5B, UE 115-*g* or 115-*h* (e.g., a UE 115 within service) may determine its own sidelink DRX configuration. For example, UE 115-*g* may determine its own sidelink DRX configuration. In some cases, determining a sidelink DRX configuration at a UE 115 may include coordinating one or more parameters with another UE 115, and signaling the other UE 115 regarding the sidelink DRX configuration. For example, UE 115-*h* may transmit, to UE 115-*g* and at 525, an indication of one or more sidelink DRX preferences as described herein (e.g., may perform a unicast transmission on a PC5 interface). Based on the one or more preferences (e.g., and other signaling), UE 115-*g* may determine or select a sidelink DRX configuration and may transmit, at 530, an indication of associated configuration information to UE 115-*h* (e.g., may perform a unicast transmission on a PC5 interface).

In some cases, UE 115-*g* may also transmit an indication of the configuration information to a base station 105-*c* at 530 or at another time (e.g., to inform the network of the sidelink DRX configuration, via a Uu interface). In some cases, base station 105-*c* may reconfigure the sidelink DRX mode (e.g., based on available information) and may transmit an indication of the reconfiguration (e.g., configuration information) to UE 115-*g* at 535. In such cases, UE 115-*g* may transmit an indication of the reconfiguration to UE 115-*h* (e.g., at 540).

In a fourth example illustrated by FIG. 5B, UE 115-*g* may represent a group leader that may configure a sidelink DRX mode for a group of UEs 115 including UE 115-*h* (e.g., may configure the sidelink DRX mode for all UEs 115 in the group). In such cases, UE 115-*g* may be in charge of group management. In these examples, UE 115-*g* (e.g., the group leader) may transmit the configuration information to other UEs 115 of the group (e.g., including UE 115-*h*, at 530) via groupcast signaling (e.g., via a PC5 interface). As described herein, UE 115-*h* (e.g., among other UEs 115) may transmit, to UE 115-*g* and at 525, an indication of one or more sidelink DRX preferences (e.g., may perform a unicast transmission on a PC5 interface), based on UE 115-*g* being the group leader. In some cases, the configuration information may be based on the one or more preferences. In some examples, UE 115-*h* may represent an out-of-coverage UE 115, which may obtain sidelink DRX information from the group leader, because the group leader may configure the sidelink DRX mode without control from a base station 105.

In some cases, UE 115-*g* may also transmit an indication of the configuration information to base station 105-*c* at 530 or at another time (e.g., to inform the network of the sidelink DRX configuration, via a Uu interface). In some cases, base station 105-*c* may reconfigure the sidelink DRX mode (e.g., based on available information) and may transmit an indication of the reconfiguration (e.g., configuration information) to UE 115-*g* at 535. In such cases, UE 115-*g* may transmit an indication of the reconfiguration to UE 115-*h* (e.g., at 540).

Figure 6A:
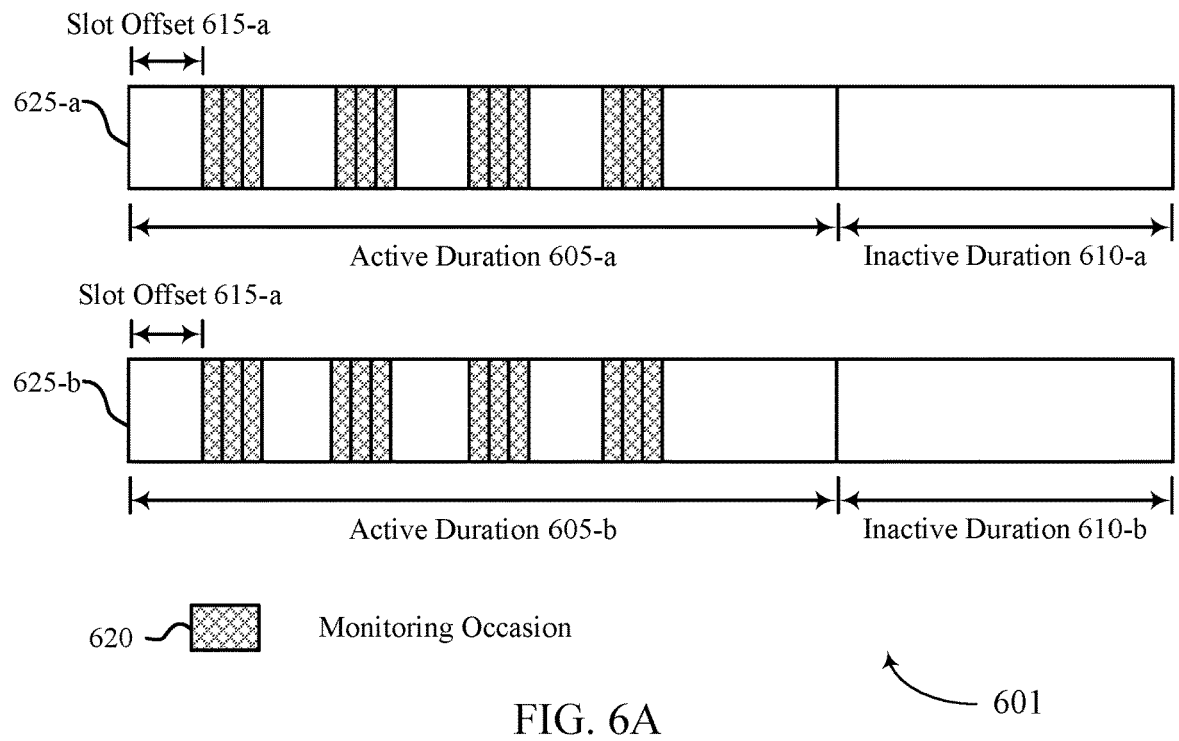
FIGS. 6A and 6B illustrate examples of DRX configurations that support timer-based DRX for sidelink communications in accordance with aspects of the present disclosure.
Figure 6B:
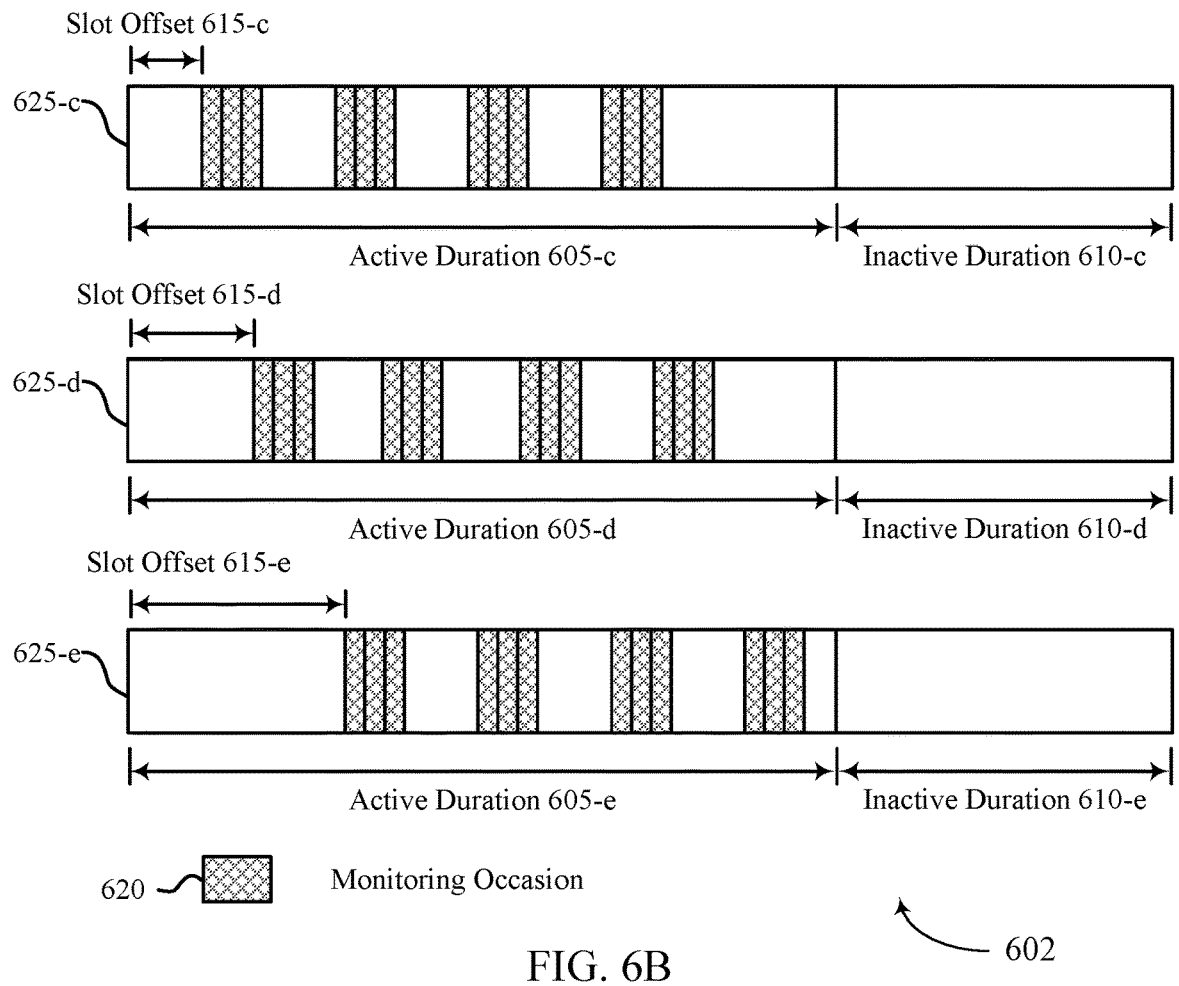

FIGS. 6A, 6B, and 6C illustrate examples of DRX configurations 601 and 602 that support timer-based DRX for sidelink communications in accordance with aspects of the present disclosure. DRX configurations 601 and 602 may implement or be implemented by some aspects of wireless communications system 100 or 200. For example, DRX configurations 601 and 602 may represent a sidelink DRX configuration and may be implemented by a UE 115 to determine to monitor or refrain from monitoring a sidelink channel (e.g., for one or more sidelink communications), where the UE 115 may represent an example of a UE 115 described with reference to FIGS. 1-5.

In some cases, the UE 115 may be enrolled in multiple wireless services, where each wireless service may be associated with a different sidelink DRX configuration. For example, the UE 115 may be enrolled in one or more of unicast, groupcast, and broadcast services for wireless communications, among other examples. When enrolled in multiple services, power consumption at the UE 115 may be high. For example, if the monitoring occasions 620 for the different sidelink DRX configurations do not overlap, the UE 115 may rarely (e.g., if ever) enter a sleep mode (e.g., refrain from monitoring the sidelink channel). In some cases, however, if all of the monitoring occasions 620 of the sidelink DRX configurations overlap, there may be some portions (e.g., large portions) of the common, active durations 605 that are left unused. The network may therefore optimize or configure the different sidelink DRX configurations to reduce power consumption and increase spectral efficiency (e.g., usage).

For example, a base station 105 (e.g., as described with reference to FIGS. 1-5) may coordinate the different sidelink DRX configurations (e.g., different cycles) for the different services. In such cases, the base station 105 may determine to fully align or partially align monitoring occasions 620 for the different services. In a first example, illustrated by FIG. 6A, the monitoring occasions 620 (e.g., on slots or TTIs) for the different services may be aligned. In this example, a first option 625-a and a second option 625-b may represent respective configuration options for different services, where the monitoring occasions 620 are aligned for the different options 625. For example, options 625-a and 625-b may be associated with a same slot offset 615-a.

In a second example, illustrated by FIG. 6B, the monitoring occasions 620 (e.g., on slots or TTIs) for the different services may be partially aligned by the base station 105. For example, a first option 625-c, a second option 625-d, and a third option 625-e may represent respective configuration options for different services, where the monitoring occasions 620 may be partially aligned for the different services. In such cases, option 625-c may be associated with a slot offset 615-c, option 625-d may be associated with a slot offset 615-d, and option 625-e may be associated with a slot offset 615-e. In some cases, the base station 105 may configure the options 625 for the sidelink DRX configurations such that all monitoring occasions 620 of the different options 625 sum up to an active duration 605. In some cases, the base station 105 may make a decision or determination as to which service may use which option 625 (e.g., in a global manner or in a local area).

In any of the examples described herein, a UE 115 (e.g., a group leader or individual UE 115 as described herein) may choose or select one of the configured options 625 for a sidelink DRX mode. In such cases, the options 625 may be applicable to groupcast and unicast, but not to broadcast transmissions. In some cases, a group leader UE 115 may select an option 625 for one or more UEs 115 in a group, or an individual UE 115 may select an option 625 for itself or for another UE 115 with which it is coordinating. In some cases, a designated UE 115 may coordinate sidelink DRX cycles for UEs 115 within a service. For example, a group leader may coordinate the sidelink DRX cycles for groupcast communications and an individual UE 115 may coordinate the sidelink DRX cycle for unicast communications (e.g., between two UEs 115). In the case of unicast communications, the sidelink DRX cycles or configuration may be based on a priority of one or both UEs 115, a negotiation or coordination between the UEs 115, or a decision made by a base station 105.

When two services or groups of UEs 115 select or are associated with a same option 625, the services or groups may be associated with a same sidelink DRX cycle timing or alignment, for example, even if other services or groups are associated with different alignments (e.g., partial alignments).

Figure 7:
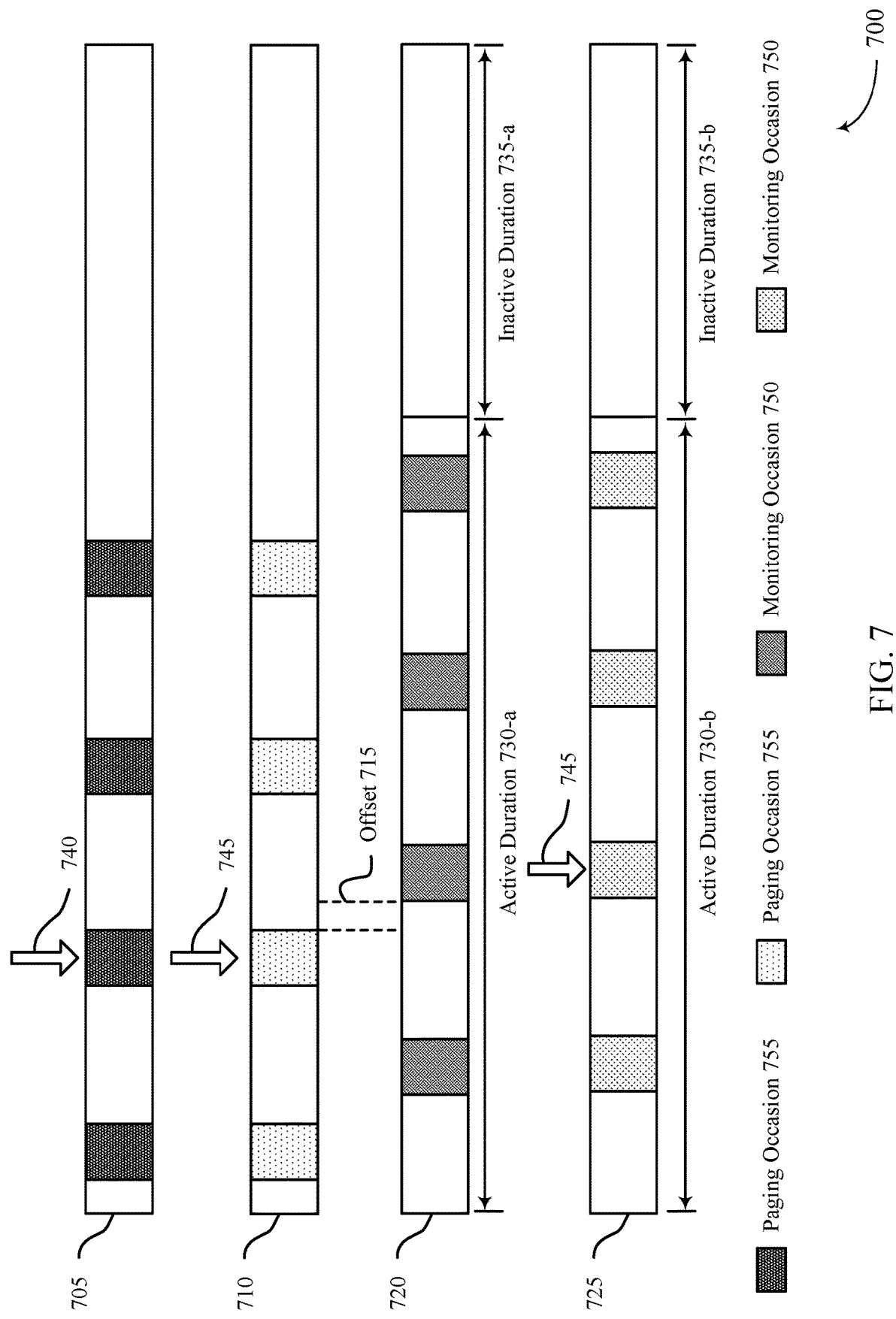
FIG. 7 illustrates an example of a DRX configuration that supports timer-based DRX for sidelink communications in accordance with aspects of the present disclosure.

FIG. 7 illustrates an example of a DRX configuration 700 that supports timer-based DRX for sidelink communications in accordance with aspects of the present disclosure. DRX configuration 700 may implement or be implemented by some aspects of wireless communications system 100 or 200. For example, DRX configuration 700 may represent a sidelink DRX configuration and may be implemented by a UE 115 to determine to monitor or refrain from monitoring a sidelink channel (e.g., for one or more sidelink communications), where the UE 115 may represent an example of a UE 115 described with reference to FIGS. 1-6.

In some cases, a transmitting UE 115 and a receiving UE 115 may coordinate sidelink monitoring occasions 750 within active durations 730, for example, to support transmission and reception of sidelink information. The UEs 115 may refrain from monitoring or communicating in the inactive durations 735, as described herein. Sidelink DRX monitoring occasions 750 may also be coordinated in a context of relaying (e.g., relaying a message or transmission from a first UE 115 to a second UE 115). For example, a relay UE 115 may transmit a message to a target UE 115 during a monitoring occasion 750 of the target UE 115, such that the target UE 115 may monitor for and receive the message. The relayed message may be a data message or a paging message (e.g., or another type of message).

In one example described herein, the relay UE 115 and the target UE 115 may have aligned monitoring occasions 750 (e.g., same monitoring occasions 750), where the sidelink DRX configuration for the relay UE 115 may be represented by option 720 and the sidelink DRX configuration for the target UE may be represented by option 725. In some cases, the monitoring occasions 750 may be partially aligned, such that the partial alignment may still support transmission from the relay UE 115 (e.g., to transmit a paging or other message) during an overlapping monitoring occasion 750. In some cases, full or partial alignment may not be supported (e.g., based on a sidelink DRX configuration of the target UE 115 and/or relay UE 115). In such cases, the UEs 115 and/or the network may perform re-selection of a relay UE 115 (e.g., to a relay UE 115 with at least partially aligned monitoring occasions 750).

In cases where the monitoring occasions at least partially overlap, a relay UE 115 may transmit a message to a target UE 115 within a shared monitoring occasion 750 or within overlapping portions of monitoring occasions 750. Doing so may reduce delays (e.g., between reception of a paging or other message, such as via Uu, and transmission of the paging or other message, such as via PC5), reduce power consumption, and increase battery life at one or both of the UEs 115. In some cases, a relay UE 115 may be unable to coordinate with multiple target UEs 115, or may coordinate multiple different monitoring occasions 750 with target UEs 115, which may increase an on time for the relay UE 115 and increase power consumption.

In some cases, the monitoring occasions 750 shared by the target UE 115 and relay UE 115 may be aligned (e.g., at least partially) with one or more paging occasions 755 for the target UE 115 (e.g., on the Uu interface). In such cases, the relay UE 115 may monitor the paging occasions 755 of the target UE 115 (e.g., to receive a paging relay request message 740 and forward an associated paging message 745). In some cases, there may be an offset 715 between a paging occasion 755 and monitoring occasion 750 to support processing of the paging relay request message 740 and transmission of the paging message 745 (e.g., via sidelink). The offset may be configured, for example, to support beam management, such as selection of a transmit and/or receive beam for the relayed message (e.g., paging message 745).

In some cases, the relay UE 115 may receive the paging relay request message 740 from the network, for example, independent of paging occasions 755 of the target UE 115. For example, the relay UE 115 may receive the paging relay request message 740 via a Uu interface and during a DRX monitoring occasion for the relay UE 115 on the Uu interface. The sidelink DRX monitoring occasions 750 may, in some cases, be at least partially aligned with the DRX monitoring occasions of the relay UE 115 (e.g., based on a connected DRX cycle 705) to support such reception and forwarding of the paging message 745.

The sidelink DRX monitoring occasions 750 may thus be aligned with the relay UE 115 connected DRX cycle 705 (e.g., on the Uu interface) or with an idle DRX cycle 710 (e.g., including paging occasions 755) of the target UE 115 (e.g., on the Uu interface).

Figure 8:
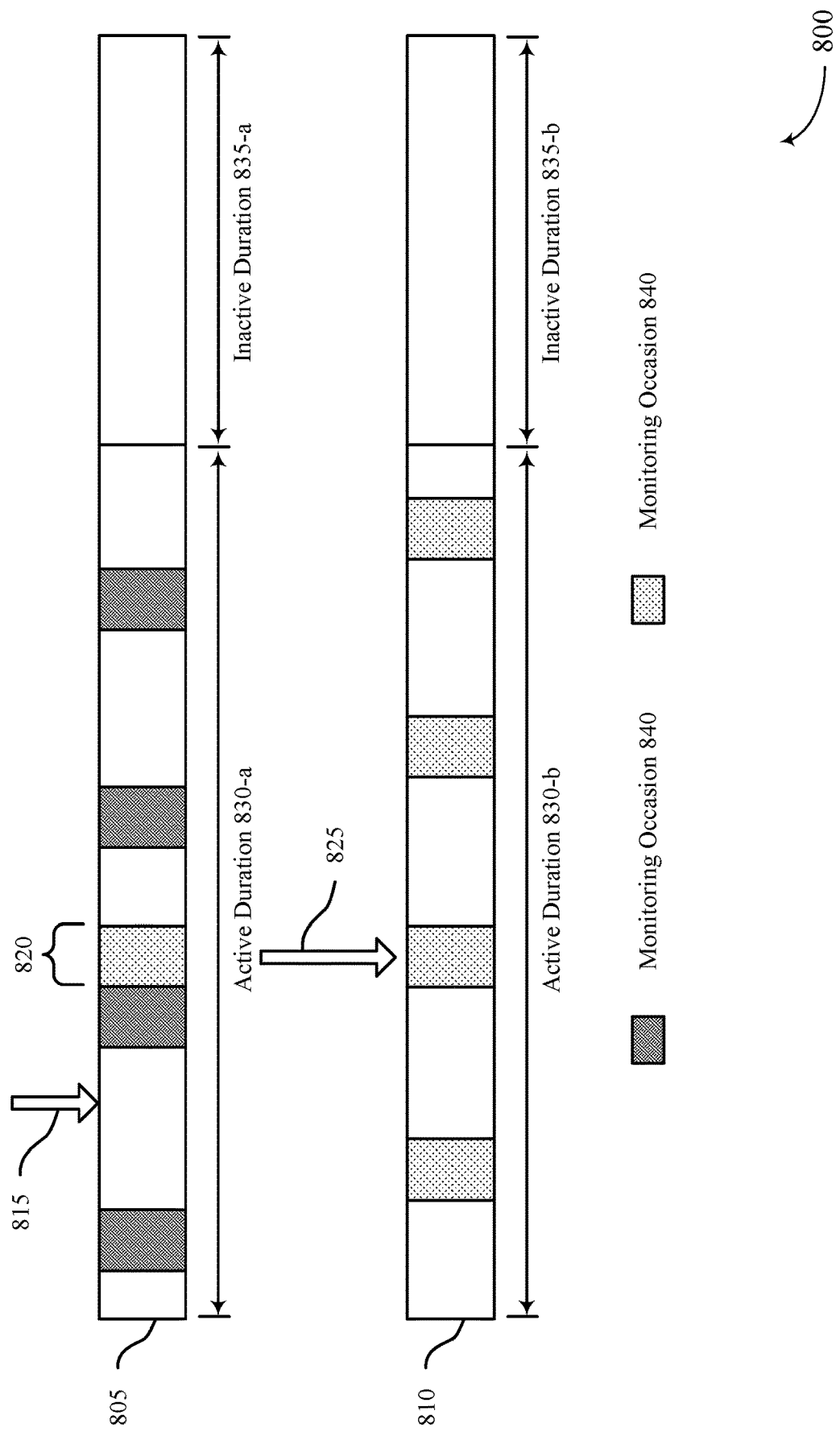
FIG. 8 illustrates an example of a DRX configuration that supports timer-based DRX for sidelink communications in accordance with aspects of the present disclosure.

FIG. 8 illustrates an example of a DRX configuration 800 that supports timer-based DRX for sidelink communications in accordance with aspects of the present disclosure. DRX configuration 800 may implement or be implemented by some aspects of wireless communications system 100 or 200. For example, DRX configuration 800 may represent a sidelink DRX configuration and may be implemented by a UE 115 to determine to monitor or refrain from monitoring a sidelink channel (e.g., for one or more sidelink communications), where the UE 115 may represent an example of a UE 115 described with reference to FIGS. 1-7.

As described with reference to FIG. 7, a transmitting UE 115 and a receiving UE 115 may coordinate sidelink monitoring occasions 840 within active durations 830, for example, to support transmission and reception of sidelink information. The UEs 115 may refrain from monitoring or communicating in the inactive durations 835, as described herein. Sidelink DRX monitoring occasions 840 may also be coordinated in a context of relaying (e.g., relaying a message or transmission from a first UE 115 to a second UE 115). For example, a relay UE 115 may transmit a message to a target UE 115 during a monitoring occasion 840 of the target UE 115, such that the target UE 115 may monitor for and receive the message. The relayed message may be a data message or a paging message (e.g., or another type of message).

In one example described herein, the relay UE 115 and the target UE 115 may not have aligned monitoring occasions 840, such that an option 805 for the relay UE 115 may have different, independent (e.g., non-overlapping) monitoring occasions compared to an option 810 for the target UE 115. In such cases, reception of a paging relay request message 815 at the relay UE 115 may trigger an active time 820 for the relay UE 115, where active time 820 may overlap (e.g., at least partially) with a next monitoring occasion 840 of the target UE 115, enabling on-demand coordination of the relay UE and target UE. The relay UE 115 may transmit or relay a paging message 825 during the active time 820, which may support reception of the paging message 825 at the target UE 115 (e.g., during a monitoring occasion 840 of the target UE 115). Such a configuration may decrease power use and support spectral efficiency when paging messages are transmitted less frequently. Because monitoring occasions 840 are independent between the target UE 115 and the relay UE 115, this configuration may support serving multiple target UEs 115 at the relay UE 115 (e.g., without coordinating monitoring occasions 840).

In order to support transmitting the paging message 825 during the active time 820, the relay UE 115 may be aware of at least a next monitoring occasion 840 of the target UE 115. In a first example, the paging relay request message 815 (e.g., from a base station 105 as described herein) may include an indication of the sidelink DRX configuration for the target UE 115 or an indication of a time to transmit the paging message 825. As such, the relay UE 115 may not store the sidelink DRX configuration of the target UE 115. In a second example, the relay UE 115 may store a paging relay association between the target UE 115 and the relay UE 115, which may include the sidelink DRX configuration for the target UE 115 (e.g., or monitoring occasions 840 thereof). Such information may be received from the target UE 115, a base station 105, or another wireless device and stored at the relay UE 115. It is to be understood that examples described herein as related to paging messages 825 and corresponding paging relay request messages 815 may alternatively be applied in the context of any other message type or types, such as data (e.g., shared channel) messages.

Figure 9:
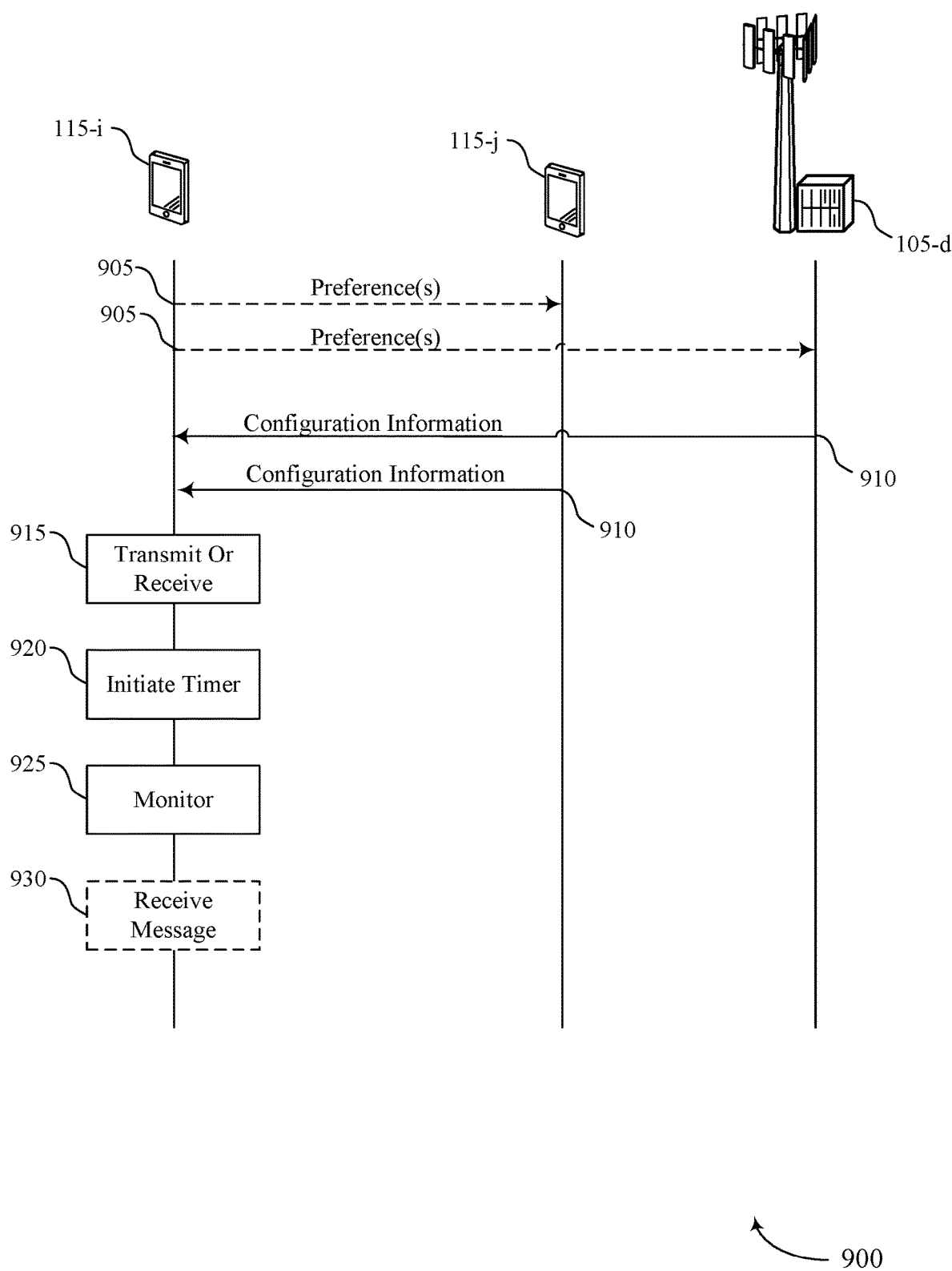
FIG. 9 illustrates an example of a process flow that supports timer-based DRX for sidelink communications in accordance with aspects of the present disclosure.

FIG. 9 illustrates an example of a process flow 900 that supports timer-based DRX for sidelink communications in accordance with aspects of the present disclosure. In some examples, process flow 900 may implement or be implemented by some aspects of wireless communications system 100 or 200. For example, process flow 900 may be implemented by a base station 105-d and UEs 115-i and 115-j, which may represent respective examples of a base station 105 and UEs 115 described with reference to FIGS. 1-8. As described herein, UE 115-i may operate in a sidelink DRX mode.

In the following description of process flow 900, the operations may be performed in a different order than the order shown, or the operations performed by UE 115-i, UE 115-j, and base station 105-d may be performed in different orders or at different times. For example, specific operations may also be left out of process flow 900, or other operations may be added to process flow 900. Although UE 115-i, UE 115-j, and base station 105-d are shown performing the operations of process flow 900, some aspects of some operations may also be performed by one or more other wireless devices.

At 905, in some cases, UE 115-i may transmit, to UE 115-j or base station 105-d, an indication of one or more preferences for a sidelink DRX mode, as described herein. For example, UE 115-i may transmit the one or more preferences to base station 105-d if the sidelink DRX mode is configured by base station 105-d. In some cases, UE 115-i may transmit the one or more preference to base station 105-d via UE 115-j (e.g., UE 115-j may forward the one or more preferences). UE 115-i may transmit the one or more preferences to UE 115-j if the sidelink DRX mode is configured by UE 115-j, or is configured between UE 115-i and UE 115-j.

At 910, base station 105-d or UE 115-j may transmit, to UE 115-i, configuration information associated with the sidelink DRX mode. In some cases, the configuration information may be based on the one or more preferences. The configuration information may be determined by UE 115-j (e.g., alone, or with UE 115-i) or by base station 105-d, as described herein. In some cases, UE 115-j may relay the configuration information from base station 105-j. The configuration information may include parameters associated with the sidelink DRX mode for UE 115-i (e.g., including an inactivity timer). The sidelink DRX mode may correspond to one or more active durations shared by a group of UEs 115 including UE 115-I, and one or more inactive durations shared by the group of UEs 115.

In some cases, base station 105-d may configure one or more options for the sidelink DRX mode (e.g., monitoring occasion alignment) for different groups of UEs 115 or different services. Base station 105-d, UE 115-j, UE 115-i, or any combination thereof (e.g., based which device(s) configures the sidelink DRX mode), may select an option of the one or more options for the sidelink DRX mode.

At 915, UE 115-*i* may transmit or receive, to or from another UE 115 of the group, a sidelink communication during an active duration of the one or more active durations. For example, UE 115-*i* may transmit or receive sidelink data. In some cases, UE 115-*i* may receive a paging or other message as described herein.

At 920, UE 115-*i* may initiate a timer (e.g., an inactivity timer as described herein) based on transmitting or receiving the sidelink communication during the active duration. For example, UE 115-*i* may initiate and manage the timer (e.g., among other timers) as described herein.

At 925, UE 115-*i* may monitor a sidelink channel associated with the group of UEs 115 after initiating the timer, for a time period based on the duration of the timer. In some cases, UE 115-*i* may continue the timer into an inactive duration, while in some cases, UE 115-*i* may pause the timer during the inactive duration and continue the timer in a next active duration. In some cases, UE 115-*i* may terminate the timer at the inactive duration.

At 930, in some cases, UE 115-*i* may receive a paging or other message from another UE 115 based on having aligned monitoring occasions with the other UE 115, or based on the other UE being aware of the monitoring occasions of UE 115-*i*.

Figure 10:
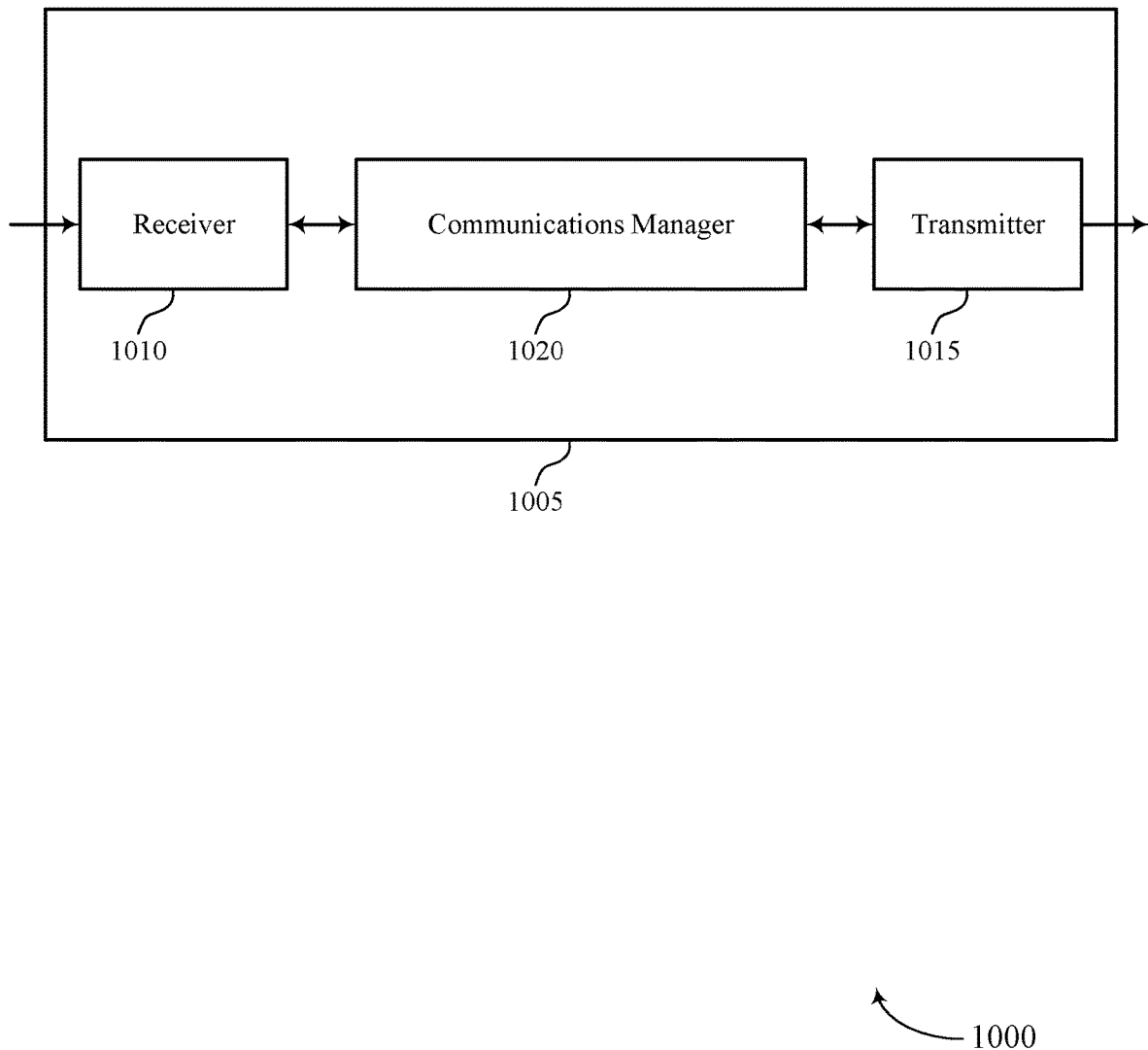
FIGS. 10 and 11 show block diagrams of devices that support timer-based DRX for sidelink communications in accordance with aspects of the present disclosure.

FIG. 10 shows a block diagram 1000 of a device 1005 that supports timer-based DRX for sidelink communications in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to timer-based DRX for sidelink communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to timer-based DRX for sidelink communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of timer-based DRX for sidelink communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first UE of a group of UEs in accordance with examples as disclosed herein. For example, the communications manager 1020 may be configured as or otherwise support a means for receiving configuration information for a sidelink DRX mode that corresponds to one or more active durations shared by the group of UEs and one or more inactive durations shared by the group of UEs, where the configuration information indicates a duration of a timer (e.g., an inactivity timer as described herein). The communications manager 1020 may be configured as or otherwise support a means for transmitting or receiving, to or from another UE of the group of UEs, a sidelink communication during an active duration of the one or more active durations. The communications manager 1020 may be configured as or otherwise support a means for initiating the timer based on transmitting or receiving the sidelink communication during the active duration. The communications manager 1020 may be configured as or otherwise support a means for monitoring a sidelink channel associated with the group of UEs after initiating the timer and for a time period based on the duration of the timer.

Additionally or alternatively, the communications manager 1020 may support wireless communication at a first UE of a group of UEs in accordance with one or more other examples as disclosed herein. For example, the communications manager 1020 may be configured as or otherwise support a means for transmitting, to a second UE of the group of UEs, configuration information for a sidelink DRX mode, the sidelink DRX mode corresponding to one or more active durations shared by the group of UEs and one or more inactive durations shared by the group of UEs. The configuration information may indicate a duration of a timer for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

The actions performed by the communications manager 1020, among other examples herein, may be implemented to realize one or more potential advantages. For example, communications manager 1020 may increase available battery power and communication quality at a wireless device (e.g., a UE 115) by supporting a timer-based DRX mode for sidelink communications. The increase in communication quality may result in increased link performance and decreased overhead based on using the sidelink DRX mode. Accordingly, communications manager 1020 may save power and increase battery life at a wireless device (e.g., a UE 115) by strategically increasing a quality of communications at a wireless device (e.g., a UE 115).

Figure 11:
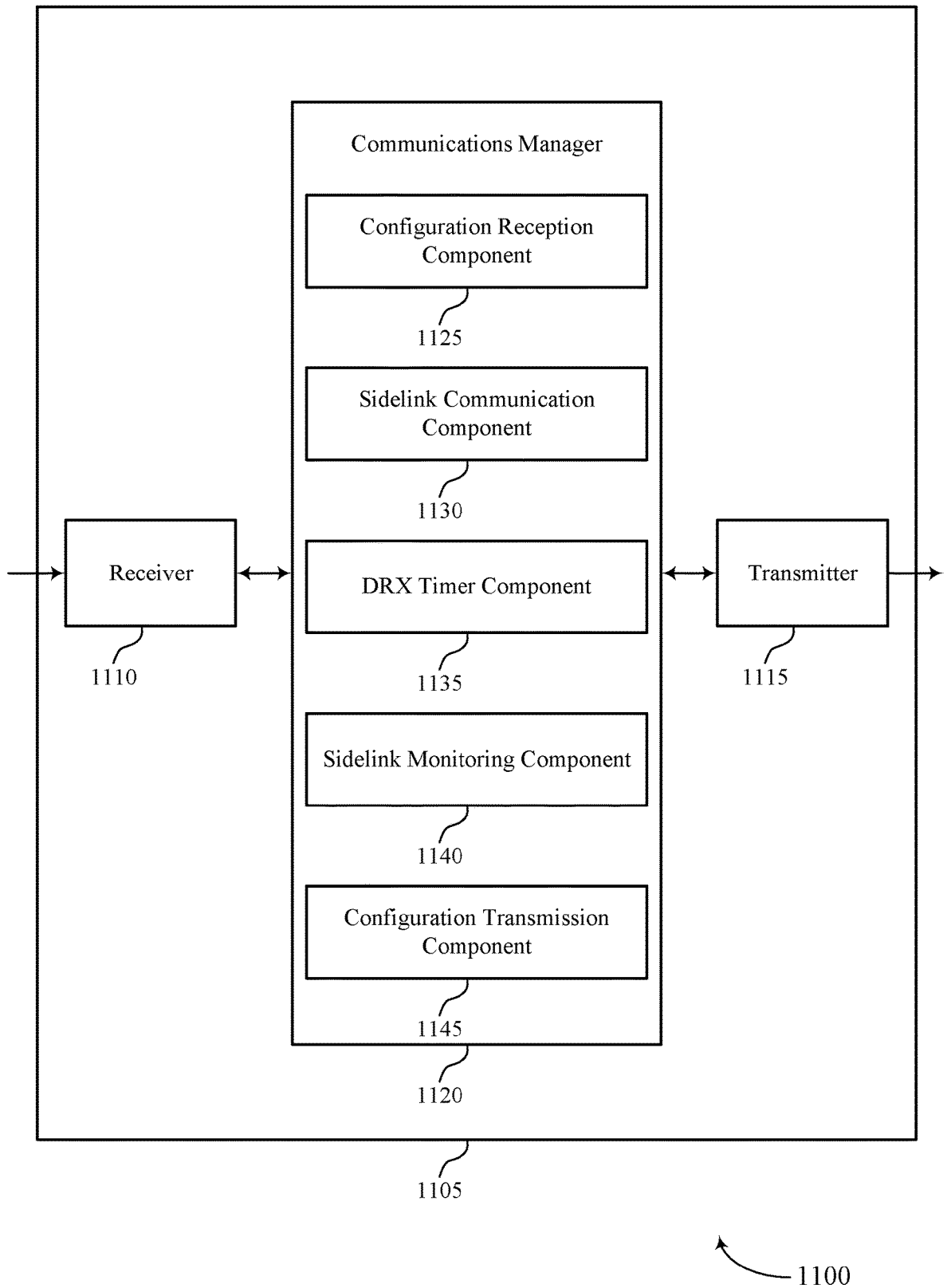

FIG. 11 shows a block diagram 1100 of a device 1105 that supports timer-based DRX for sidelink communications in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to timer-based DRX for sidelink communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to timer-based DRX for sidelink communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of timer-based DRX for sidelink communications as described herein. For example, the communications manager 1120 may include a configuration reception component 1125, a sidelink communication component 1130, a DRX timer component 1135, a sidelink monitoring component 1140, a configuration transmission component 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first UE of a group of UEs in accordance with examples as disclosed herein. The configuration reception component 1125 may be configured as or otherwise support a means for receiving configuration information for a sidelink DRX mode that corresponds to one or more active durations shared by the group of UEs and one or more inactive durations shared by the group of UEs, where the configuration information indicates a duration of a timer (e.g., an inactivity timer as described herein). The sidelink communication component 1130 may be configured as or otherwise support a means for transmitting or receiving, to or from another UE of the group of UEs, a sidelink communication during an active duration of the one or more active durations. The DRX timer component 1135 may be configured as or otherwise support a means for initiating the timer based on transmitting or receiving the sidelink communication during the active duration. The sidelink monitoring component 1140 may be configured as or otherwise support a means for monitoring a sidelink channel associated with the group of UEs after initiating the timer and for a time period based on the duration of the timer.

Additionally or alternatively, the communications manager 1120 may support wireless communication at a first UE of a group of UEs in accordance with one or more other examples as disclosed herein. The configuration transmission component 1145 may be configured as or otherwise support a means for transmitting, to a second UE of the group of UEs, configuration information for a sidelink DRX mode, the sidelink DRX mode corresponding to one or more active durations shared by the group of UEs and one or more inactive durations shared by the group of UEs. The configuration information may indicate a duration of a timer (e.g., an inactivity timer as described herein) for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

A processor of a wireless device (e.g., controlling the receiver 1110, the transmitter 1115, or the transceiver 1315 as described with reference to FIG. 13) may increase available battery power and communication quality. The increased communication quality may increase available battery power and throughput (e.g., via implementation of system components described with reference to FIG. 12) compared to other systems and techniques, for example, that do not support sidelink, timer-based DRX modes. Further, the processor of the wireless device may identify one or more aspects of a sidelink DRX mode, which may result in increased communication quality, as well as save power and increase battery life at the wireless device (e.g., by strategically supporting sidelink DRX monitoring), among other benefits.

Figure 12:
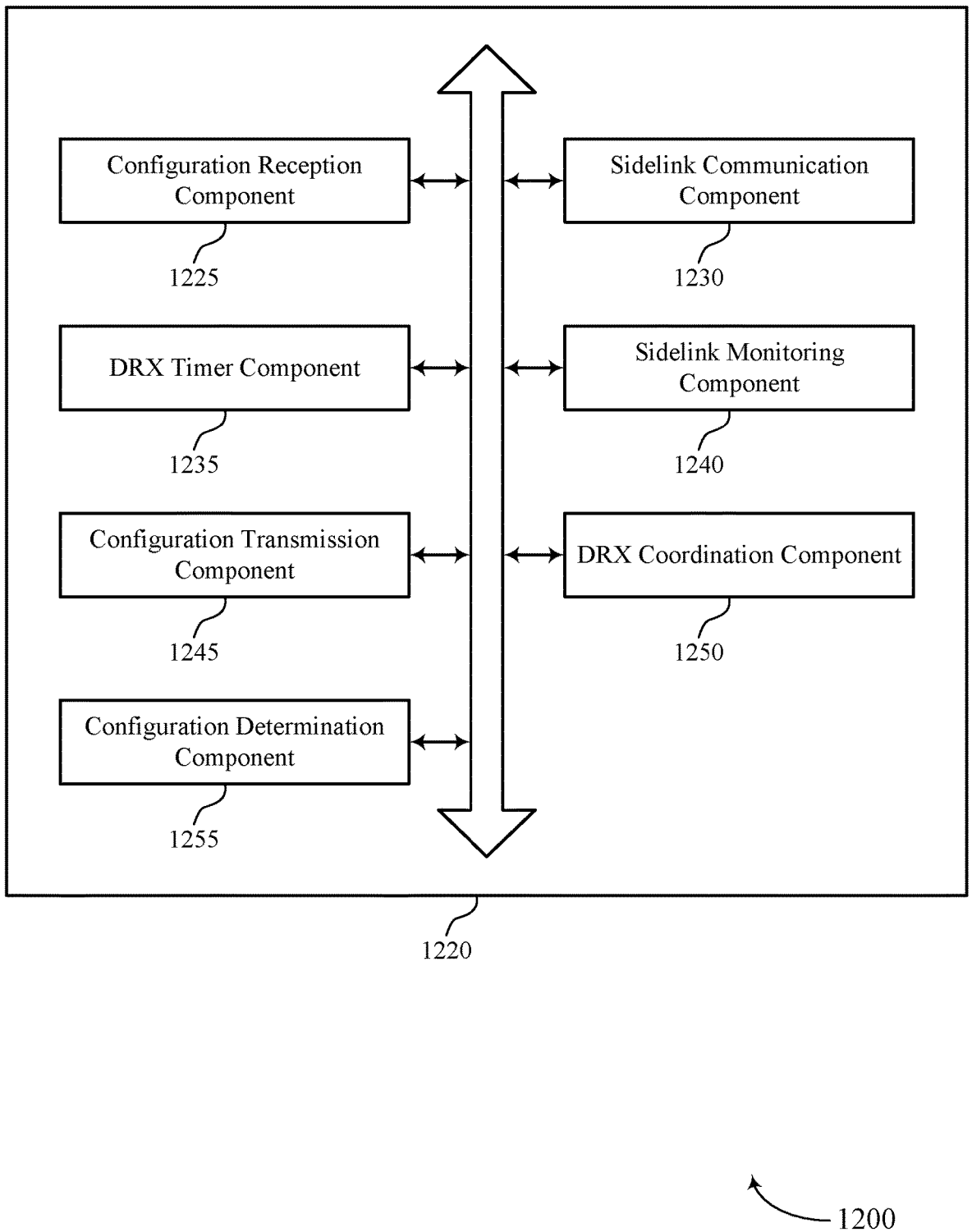
FIG. 12 shows a block diagram of a communications manager that supports timer-based DRX for sidelink communications in accordance with aspects of the present disclosure.

FIG. 12 shows a block diagram 1200 of a communications manager 1220 that supports timer-based DRX for sidelink communications in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of timer-based DRX for sidelink communications as described herein. For example, the communications manager 1220 may include a configuration reception component 1225, a sidelink communication component 1230, a DRX timer component 1235, a sidelink monitoring component 1240, a configuration transmission component 1245, a DRX coordination component 1250, a configuration determination component 1255, or any combination thereof. Each of these components may communicate, directly or indirectly, with one another (e.g., via one or more buses).

The communications manager 1220 may support wireless communication at a first UE of a group of UEs in accordance with examples as disclosed herein. The configuration reception component 1225 may be configured as or otherwise support a means for receiving configuration information for a sidelink DRX mode that corresponds to one or more active durations shared by the group of UEs and one or more inactive durations shared by the group of UEs, where the configuration information indicates a duration of a timer (e.g., an inactivity timer as described herein). The sidelink communication component 1230 may be configured as or otherwise support a means for transmitting or receiving, to or from another UE of the group of UEs, a sidelink communication during an active duration of the one or more active durations. The DRX timer component 1235 may be configured as or otherwise support a means for initiating the timer based on transmitting or receiving the sidelink communication during the active duration. The sidelink monitoring component 1240 may be configured as or otherwise support a means for monitoring a sidelink channel associated with the group of UEs after initiating the timer and for a time period based on the duration of the timer.

In some examples, to support monitoring the sidelink channel, the sidelink monitoring component 1240 may be configured as or otherwise support a means for monitoring the sidelink channel during at least a portion of a first inactive duration of the one or more inactive durations based on a value of the timer, at a beginning of the first inactive duration, being less than the duration of the timer. As described herein, a value of a timer may refer to an elapsed time since the timer was most recently initiated (e.g., as a timer may count down from some first value to zero or some other second value, or a timer may equivalently count up from some first value or zero to some other second value or limit, but regardless the value of the timer at any instant is reflective of the elapsed time since the timer was most recently initiated).

In some examples, the DRX timer component 1235 may be configured as or otherwise support a means for pausing the timer based on a value of the timer, at a beginning of a first inactive duration of the one or more inactive durations (e.g., the first active duration after the active duration), being less than the duration of the timer. In some examples, the sidelink monitoring component 1240 may be configured as or otherwise support a means for refraining from monitoring the sidelink channel during the first inactive duration. In some examples, the DRX timer component 1235 may be configured as or otherwise support a means for restarting the timer based on a beginning of a second active duration of the one or more active durations, the second active duration after the first inactive duration, where monitoring the sidelink channel includes monitoring the sidelink channel during at least a portion of the second active duration based on restarting the timer at the beginning of the second active duration.

In some examples, the DRX timer component 1235 may be configured as or otherwise support a means for terminating the timer based on a beginning of a first inactive duration of the one or more inactive durations, where a value of the timer at the beginning of the first inactive duration is less than the duration of the timer. In some examples, the sidelink monitoring component 1240 may be configured as or otherwise support a means for refraining from monitoring the sidelink channel during the first inactive duration.

In some examples, the DRX timer component 1235 may be configured as or otherwise support a means for terminating the timer, during the active duration or a second active duration of the one or more active durations, based on a value of the timer reaching the duration of the timer. In some examples, the sidelink monitoring component 1240 may be configured as or otherwise support a means for refraining from monitoring, based on terminating the timer, for sidelink communications during a portion of the active duration or a portion of the second active duration.

In some examples, each of the one or more active durations includes one or more monitoring occasions for the first UE, and the sidelink monitoring component 1240 may be configured as or otherwise support a means for monitoring, after the portion of the active duration or the portion of the second active duration, the sidelink channel during a second monitoring occasion for the first UE.

In some examples, the sidelink communication component 1230 may be configured as or otherwise support a means for transmitting or receiving, to or from the other UE or a third UE of the group of UEs, a second sidelink communication before a value of the timer reaches the duration of the timer. In some examples, the DRX timer component 1235 may be configured as or otherwise support a means for reinitiating the timer based on transmitting or receiving the second sidelink communication before the value of the timer reaches the duration of the timer. In some examples, the sidelink monitoring component 1240 may be configured as or otherwise support a means for continuing to monitor the sidelink channel after reinitiating the timer and for a second time period based on the duration of the timer.

In some examples, the DRX timer component 1235 may be configured as or otherwise support a means for initiating a second timer based on entering a second active duration of the one or more active durations after a first inactive duration of the one or more inactive durations, where the configuration information indicates a second duration of the second timer. In some examples, the sidelink monitoring component 1240 may be configured as or otherwise support a means for refraining from monitoring, after initiating the second timer and for a second time period based on the second duration of the second timer, the sidelink channel during a first portion of the second active duration. In some examples, the sidelink monitoring component 1240 may be configured as or otherwise support a means for monitoring the sidelink channel during a second portion of the second active duration based on a value of the second timer reaching the second duration, the second portion after the first portion.

In some examples, to support receiving the configuration information, the configuration reception component 1225 may be configured as or otherwise support a means for receiving the configuration information from a base station. In some examples, to support receiving the configuration information, the configuration reception component 1225 may be configured as or otherwise support a means for receiving the configuration information from a second UE of the group of UEs. In some examples, the DRX coordination component 1250 may be configured as or otherwise support a means for transmitting an indication of one or more preferences for the sidelink DRX mode, where receiving the configuration information is based on transmitting the indication of the one or more preferences.

In some examples, the group of UEs is associated with a first service and a second group of UEs is associated with a second service. In some examples, the one or more active durations include a first set of monitoring occasions for the group of UEs that at least partially overlaps in time with a second set of monitoring occasions for the second group of UEs.

In some examples, the sidelink communication component 1230 may be configured as or otherwise support a means for receiving, during a first monitoring occasion for the first UE within a first active duration of the one or more active durations, a message from a second UE of the group of UEs via the sidelink channel, the first monitoring occasion for the first UE at least partially overlapping in time with a second monitoring occasion for the second UE within the first active duration.

In some examples, the sidelink monitoring component 1240 may be configured as or otherwise support a means for identifying a first set of monitoring occasions for the first UE within a first active duration of the one or more active durations. In some examples, the sidelink communication component 1230 may be configured as or otherwise support a means for receiving, from a base station, a first message corresponding to a second message for a second UE of the group of UEs. In some examples, the sidelink communication component 1230 may be configured as or otherwise support a means for transmitting the second message to the second UE via the sidelink channel during a monitoring occasion for the second UE within the first active duration, where transmitting the second message occurs outside of the first set of monitoring occasions for the first UE.

Additionally or alternatively, the communications manager 1220 may support wireless communication at a first UE of a group of UEs in accordance with one or more other examples as disclosed herein. The configuration transmission component 1245 may be configured as or otherwise support a means for transmitting, to a second UE of the group of UEs, configuration information for a sidelink DRX mode, the sidelink DRX mode corresponding to one or more active durations shared by the group of UEs and one or more inactive durations shared by the group of UEs. In some examples, the configuration information indicates a duration of a timer (e.g., an inactivity timer as described herein) for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

In some examples, the configuration determination component 1255 may be configured as or otherwise support a means for determining the configuration information based on the first UE being the group leader, where transmitting the configuration information is based on determining the configuration information. In some examples, the configuration reception component 1225 may be configured as or otherwise support a means for receiving, from a base station, an indication of a set of sidelink DRX mode configurations. In some examples, the configuration determination component 1255 may be configured as or otherwise support a means for determining the configuration information based on selecting a sidelink DRX mode configuration from the set of sidelink DRX mode configurations, where transmitting the configuration information is based on determining the configuration information.

In some examples, the configuration reception component 1225 may be configured as or otherwise support a means for receiving the configuration information from a base station, where transmitting the configuration information to the second UE is based on receiving the configuration information from the base station. In some examples, the sidelink communication component 1230 may be configured as or otherwise support a means for receiving, from a base station, a first message corresponding to a second message for the second UE. In some examples, the sidelink communication component 1230 may be configured as or otherwise support a means for transmitting, based on receiving the first message, the second message to the second UE via the sidelink channel during a monitoring occasion for the second UE within the one or more active durations.

In some examples, the sidelink monitoring component 1240 may be configured as or otherwise support a means for receiving, from the base station within the first message, an indication of the monitoring occasion for the second UE, where the monitoring occasion for the second UE is independent of a second monitoring occasion associated with the first UE. In some examples, the sidelink monitoring component 1240 may be configured as or otherwise support a means for receiving an indication of the monitoring occasion for the second UE prior to receiving the first message, where the monitoring occasion is independent of a second monitoring occasion for the first UE. In some examples, the monitoring occasion for the second UE at least partially overlaps in time with a second monitoring occasion for the first UE within the one or more active durations.

Figure 13:
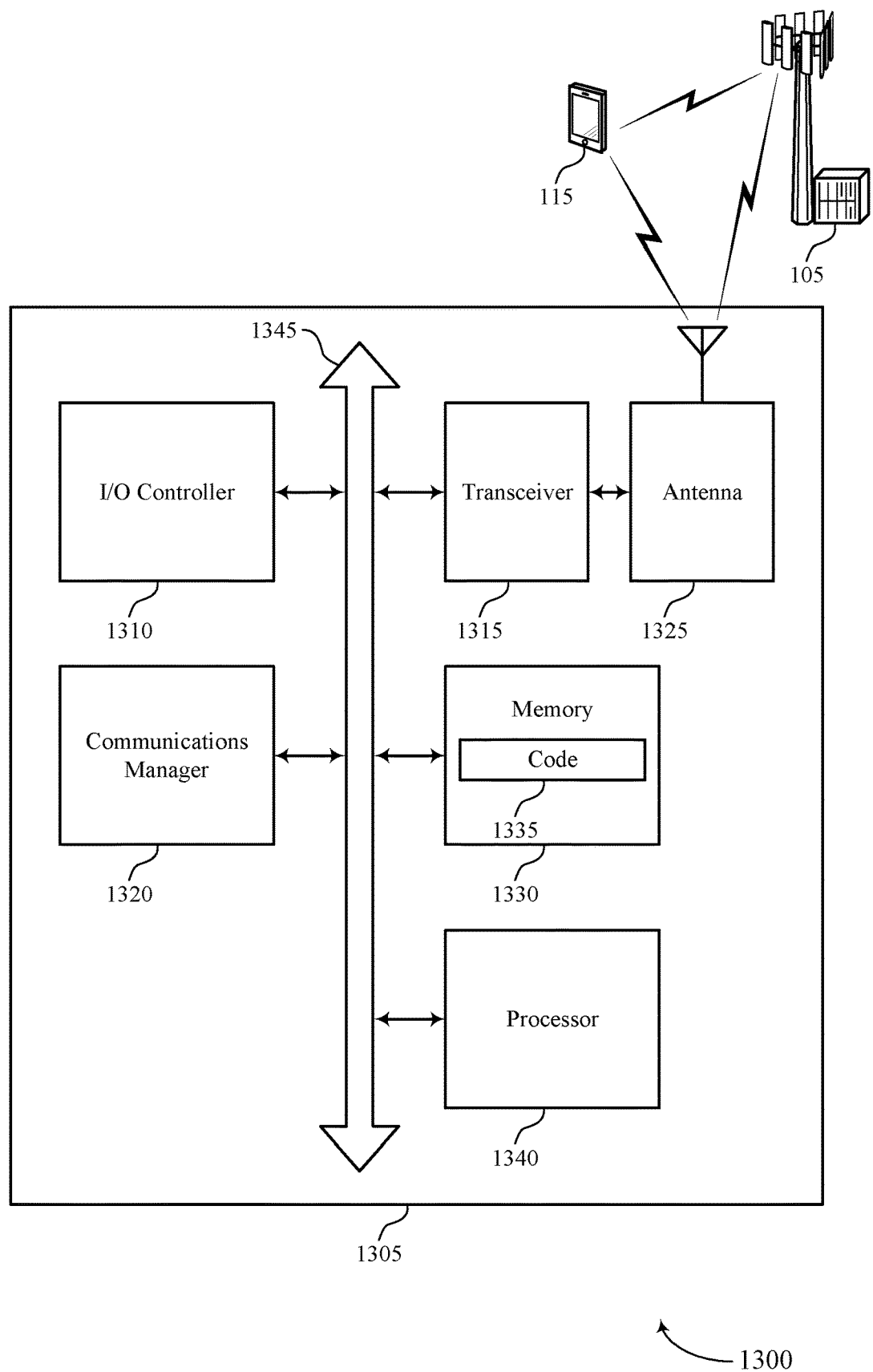
FIG. 13 shows a diagram of a system including a device that supports timer-based DRX for sidelink communications in accordance with aspects of the present disclosure.

FIG. 13 shows a diagram of a system 1300 including a device 1305 that supports timer-based DRX for sidelink communications in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting timer-based DRX for sidelink communications). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a first UE of a group of UEs in accordance with examples as disclosed herein. For example, the communications manager 1320 may be configured as or otherwise support a means for receiving configuration information for a sidelink DRX mode that corresponds to one or more active durations shared by the group of UEs and one or more inactive durations shared by the group of UEs, where the configuration information indicates a duration of a timer (e.g., an inactivity timer as described herein). The communications manager 1320 may be configured as or otherwise support a means for transmitting or receiving, to or from another UE of the group of UEs, a sidelink communication during an active duration of the one or more active durations. The communications manager 1320 may be configured as or otherwise support a means for initiating the timer based on transmitting or receiving the sidelink communication during the active duration. The communications manager 1320 may be configured as or otherwise support a means for monitoring a sidelink channel associated with the group of UEs after initiating the timer and for a time period based on the duration of the timer.

Additionally or alternatively, the communications manager 1320 may support wireless communication at a first UE of a group of UEs in accordance with examples as disclosed herein. For example, the communications manager 1320 may be configured as or otherwise support a means for transmitting, to a second UE of the group of UEs, configuration information for a sidelink DRX mode, the sidelink DRX mode corresponding to one or more active durations shared by the group of UEs and one or more inactive durations shared by the group of UEs. The configuration information may indicate a duration of a timer (e.g., an inactivity timer as described herein) for the second UE to initiate based on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of timer-based DRX for sidelink communications as described herein, or the processor 1340 and the memory 1330 may be otherwise configured to perform or support such operations.

Figure 14:
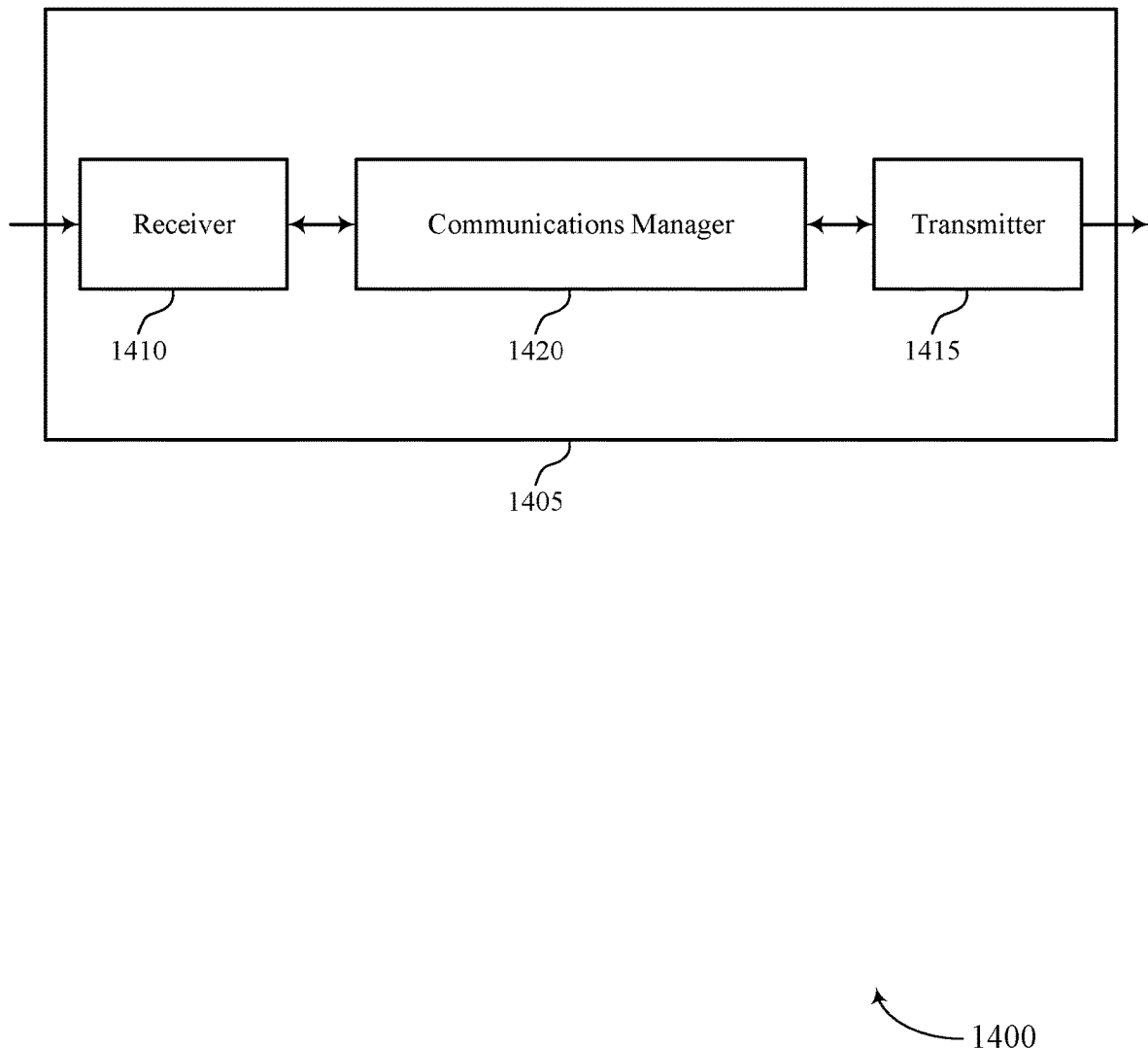
FIGS. 14 and 15 show block diagrams of devices that support timer-based DRX for sidelink communications in accordance with aspects of the present disclosure.

FIG. 14 shows a block diagram 1400 of a device 1405 that supports timer-based DRX for sidelink communications in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to timer-based DRX for sidelink communications). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to timer-based DRX for sidelink communications). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of timer-based DRX for sidelink communications as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. For example, the communications manager 1420 may be configured as or otherwise support a means for identifying (e.g., determining) or transmitting, to a first UE of a group of UEs, configuration information for a sidelink DRX mode, the sidelink DRX mode corresponding to one or more active durations shared by the group of UEs and one or more inactive durations shared by the group of UEs. The configuration information may indicate a duration of a timer (e.g., an inactivity timer as described herein) for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

Figure 15:
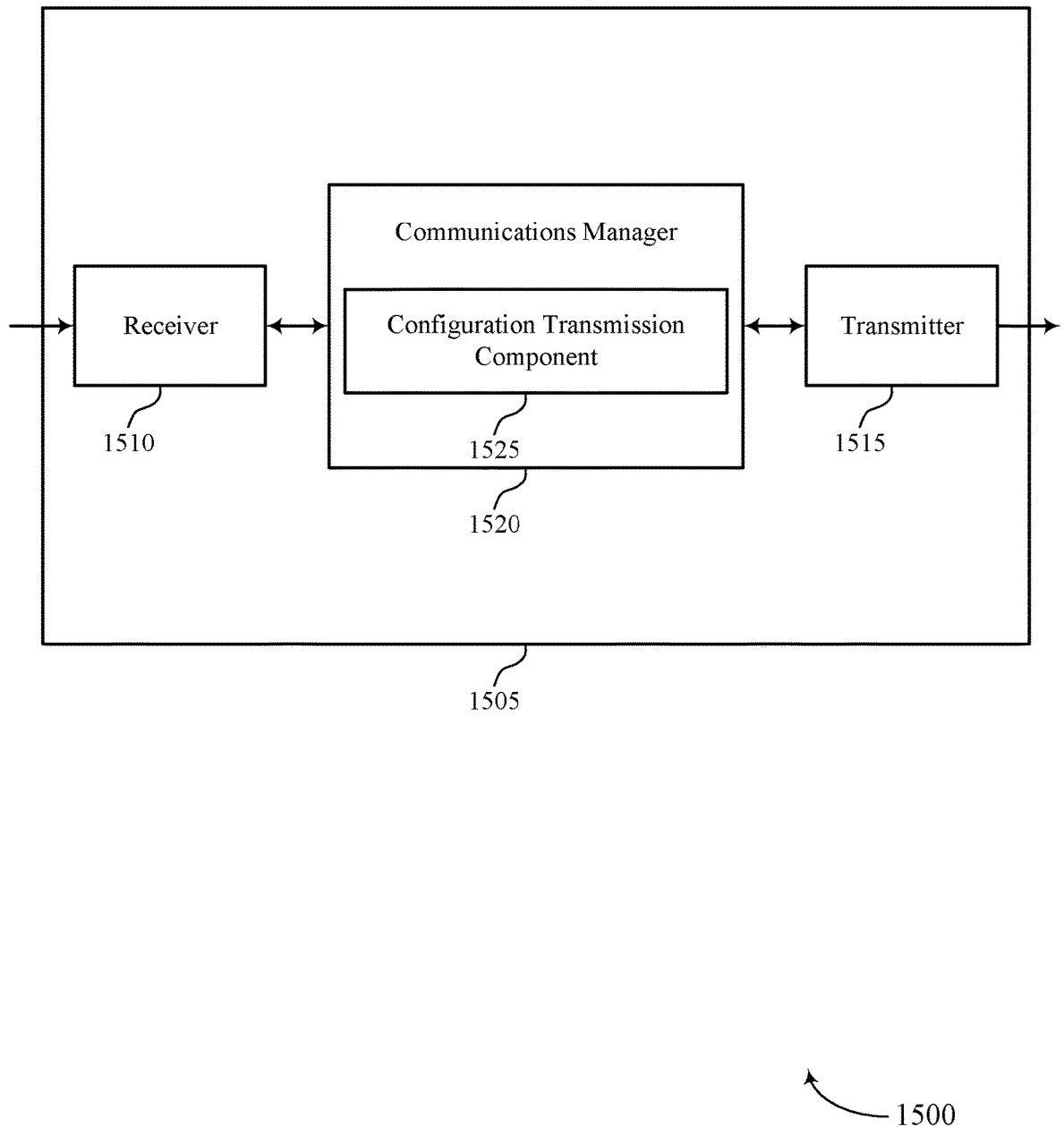

FIG. 15 shows a block diagram 1500 of a device 1505 that supports timer-based DRX for sidelink communications in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to timer-based DRX for sidelink communications). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to timer-based DRX for sidelink communications). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of timer-based DRX for sidelink communications as described herein. For example, the communications manager 1520 may include a configuration transmission component 1525, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. The configuration transmission component 1525 may be configured as or otherwise support a means for identifying (e.g., determining) or transmitting, to a first UE of a group of UEs, configuration information for a sidelink DRX mode, the sidelink DRX mode corresponding to one or more active durations shared by the group of UEs and one or more inactive durations shared by the group of UEs. The configuration information may indicate a duration of a timer (e.g., an inactivity timer as described herein) for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

Figure 16:
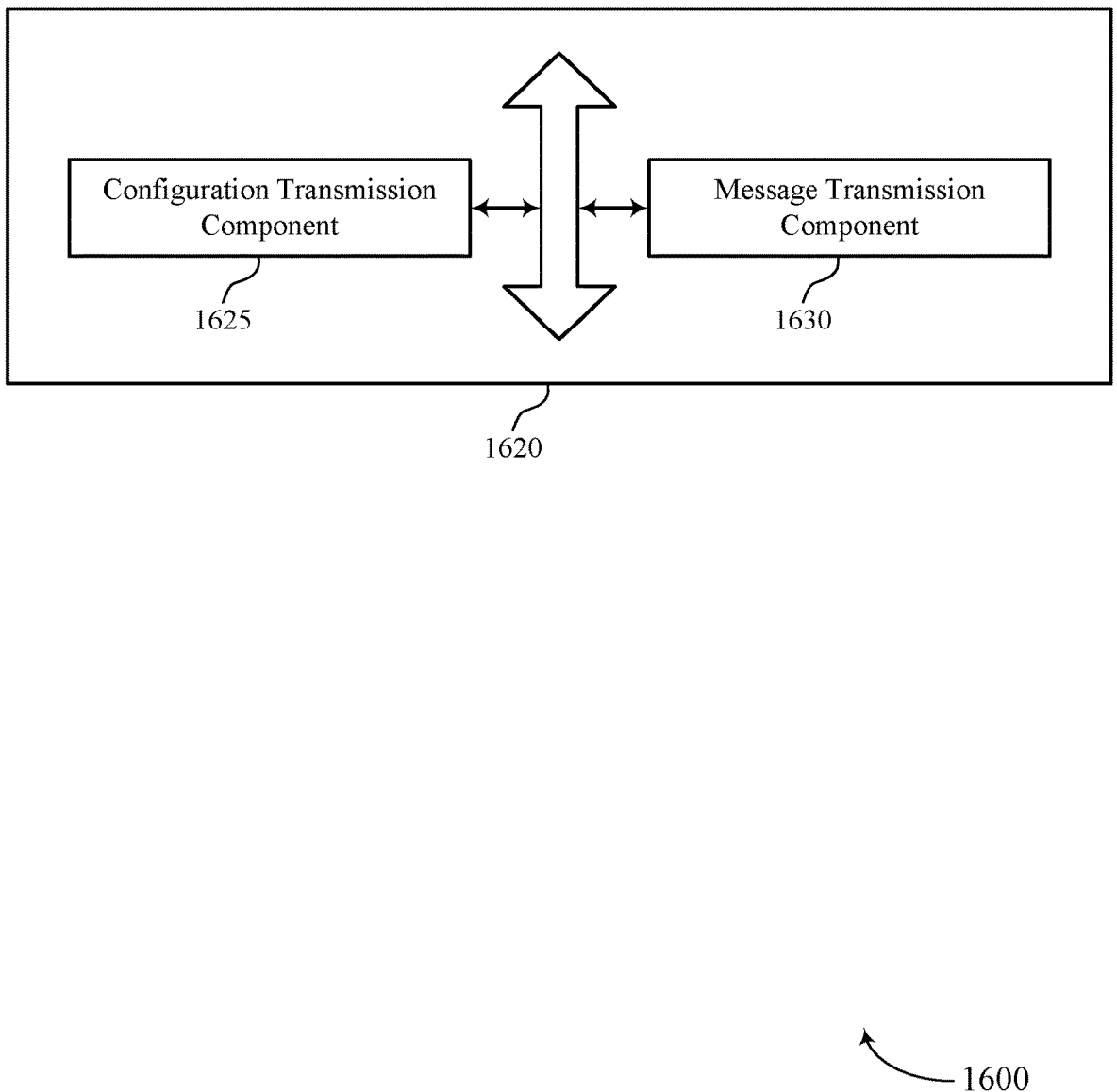
FIG. 16 shows a block diagram of a communications manager that supports timer-based DRX for sidelink communications in accordance with aspects of the present disclosure.

FIG. 16 shows a block diagram 1600 of a communications manager 1620 that supports timer-based DRX for sidelink communications in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of timer-based DRX for sidelink communications as described herein. For example, the communications manager 1620 may include a configuration transmission component 1625 a message transmission component 1630, or any combination thereof. Each of these components may communicate, directly or indirectly, with one another (e.g., via one or more buses).

The communications manager 1620 may support wireless communication at a base station in accordance with examples as disclosed herein. The configuration transmission component 1625 may be configured as or otherwise support a means for identifying (e.g., determining) or transmitting, to a first UE of a group of UEs, configuration information for a sidelink DRX mode, the sidelink DRX mode corresponding to one or more active durations shared by the group of UEs and one or more inactive durations shared by the group of UEs. In some examples, the configuration information indicates a duration of a timer (e.g., an inactivity timer as described herein) for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

In some examples, to support transmitting the configuration information, the configuration transmission component 1625 may be configured as or otherwise support a means for transmitting the configuration information for the first UE to a second UE of the group of UEs for relaying to the first UE.

In some examples, the message transmission component 1630 may be configured as or otherwise support a means for transmitting a first message to a second UE of the group of UEs, the first message for the second UE to transmit a corresponding second message to the first UE via the sidelink channel. In some examples, the message transmission component 1630 may be configured as or otherwise support a means for transmitting, to the second UE, an indication of a monitoring occasion associated with the first UE for the sidelink channel, where the monitoring occasion is independent of a second monitoring occasion associated with the second UE for the sidelink channel.

Figure 17:
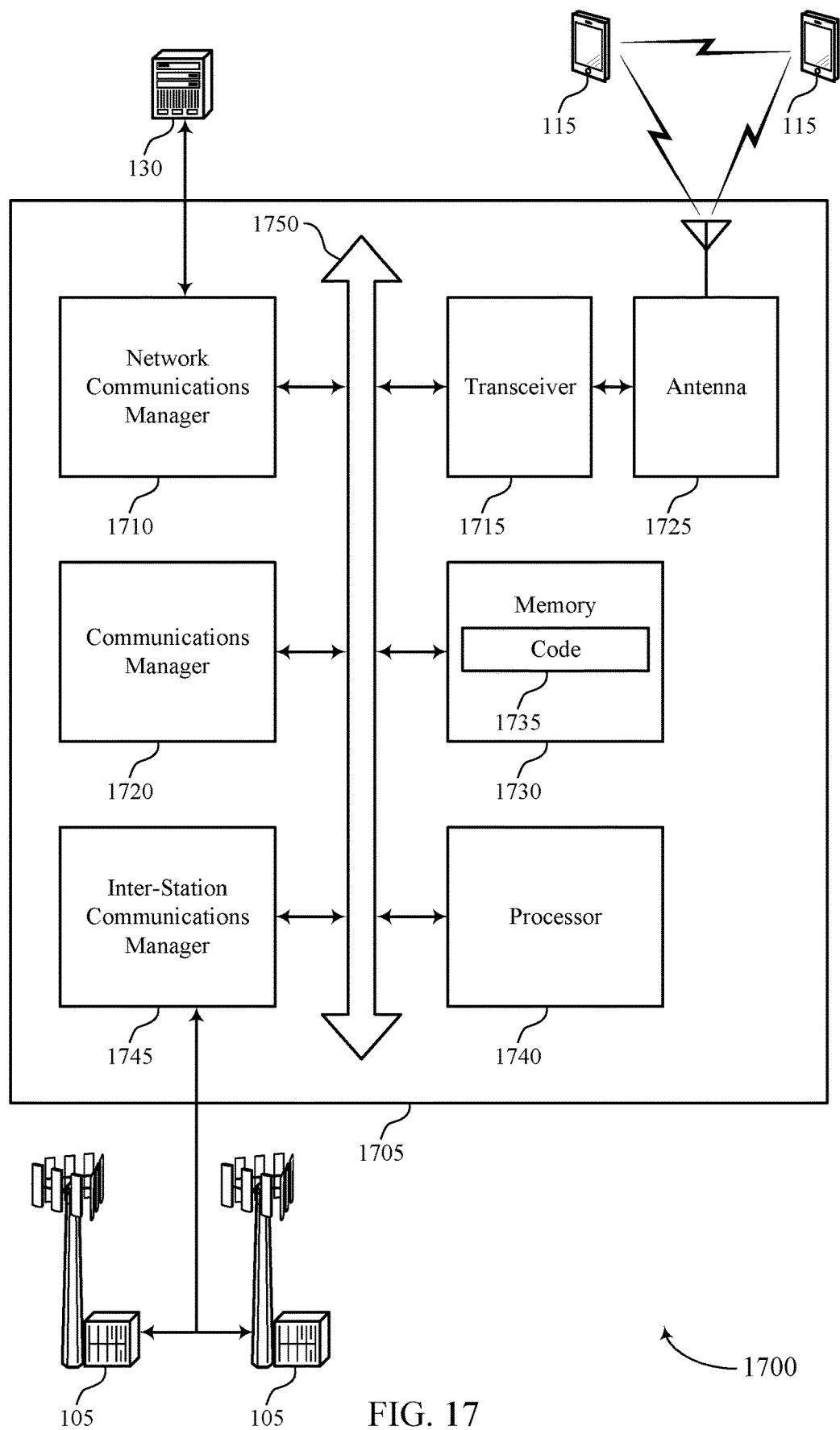
FIG. 17 shows a diagram of a system including a device that supports timer-based DRX for sidelink communications in accordance with aspects of the present disclosure.

FIG. 17 shows a diagram of a system 1700 including a device 1705 that supports timer-based DRX for sidelink communications in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting timer-based DRX for sidelink communications). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a base station in accordance with examples as disclosed herein. For example, the communications manager 1720 may be configured as or otherwise support a means for transmitting, to a first UE of a group of UEs, configuration information for a sidelink DRX mode, the sidelink DRX mode corresponding to one or more active durations shared by the group of UEs and one or more inactive durations shared by the group of UEs. The configuration information may indicate a duration of a timer (e.g., an inactivity timer as described herein) for the first UE to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of timer-based DRX for sidelink communications as described herein, or the processor 1740 and the memory 1730 may be otherwise configured to perform or support such operations.

Figure 18:
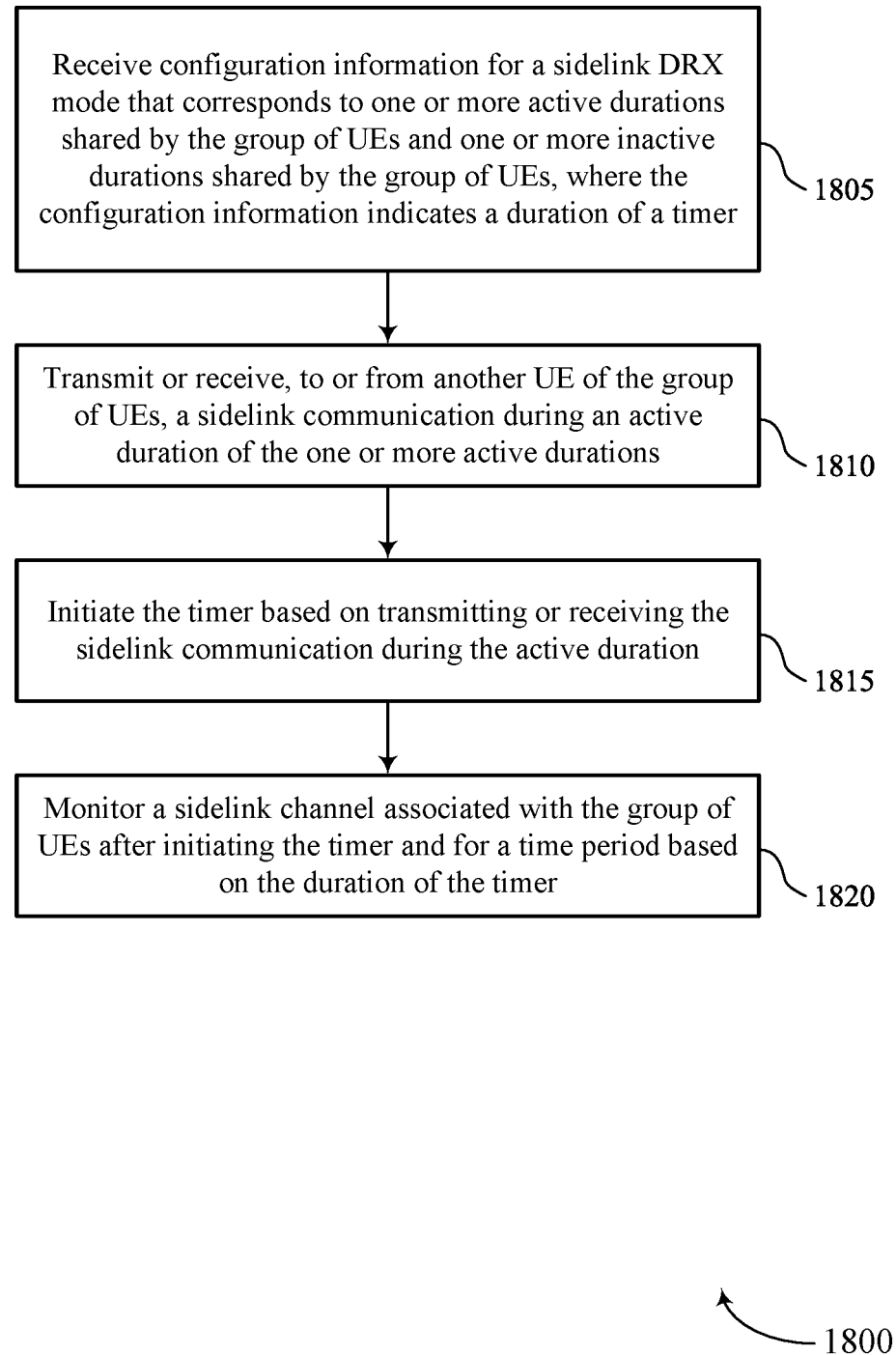
FIGS. 18 through 20 show flowcharts illustrating methods that support timer-based DRX for sidelink communications in accordance with aspects of the present disclosure.

FIG. 18 shows a flowchart illustrating a method 1800 that supports timer-based DRX for sidelink communications in accordance with aspects of the present disclosure. The operations of the method 1800 may be implemented by a UE or its components as described herein. For example, the operations of the method 1800 may be performed by a UE 115 as described with reference to FIGS. 1 through 13. In some cases, the UE may be a relay UE as described herein. Additionally or alternatively, the UE may be a target UE as described herein. In some examples, a UE may execute a set of instructions to control the functional elements of the UE to perform the described functions. Additionally or alternatively, the UE may perform aspects of the described functions using special-purpose hardware.

At 1805, the method may include receiving configuration information for a sidelink DRX mode that corresponds to one or more active durations shared by the group of UEs and one or more inactive durations shared by the group of UEs, where the configuration information indicates a duration of a timer (e.g., an inactivity timer as described herein). The operations of 1805 may be performed in accordance with examples as disclosed herein. In some examples, aspects of the operations of 1805 may be performed by a configuration reception component 1225 as described with reference to FIG. 12. Additionally or alternatively, means for performing 1805 may, but not necessarily, include, for example, antenna 1325, transceiver 1315, communications manager 1320, memory 1330 (including code 1335), processor 1340 and/or bus 1345.

At 1810, the method may include transmitting or receiving, to or from another UE of the group of UEs, a sidelink communication during an active duration of the one or more active durations. The operations of 1810 may be performed in accordance with examples as disclosed herein. In some examples, aspects of the operations of 1810 may be performed by a sidelink communication component 1230 as described with reference to FIG. 12. Additionally or alternatively, means for performing 1810 may, but not necessarily, include, for example, antenna 1325, transceiver 1315, communications manager 1320, memory 1330 (including code 1335), processor 1340 and/or bus 1345.

At 1815, the method may include initiating the timer based on transmitting or receiving the sidelink communication during the active duration. The operations of 1815 may be performed in accordance with examples as disclosed herein. In some examples, aspects of the operations of 1815 may be performed by a DRX timer component 1235 as described with reference to FIG. 12. Additionally or alternatively, means for performing 1815 may, but not necessarily, include, for example, antenna 1325, transceiver 1315, communications manager 1320, memory 1330 (including code 1335), processor 1340 and/or bus 1345.

At 1820, the method may include monitoring a sidelink channel associated with the group of UEs after initiating the timer and for a time period based on the duration of the timer. The operations of 1820 may be performed in accordance with examples as disclosed herein. In some examples, aspects of the operations of 1820 may be performed by a sidelink monitoring component 1240 as described with reference to FIG. 12. Additionally or alternatively, means for performing 1820 may, but not necessarily, include, for example, antenna 1325, transceiver 1315, communications manager 1320, memory 1330 (including code 1335), processor 1340 and/or bus 1345.

Figure 19:
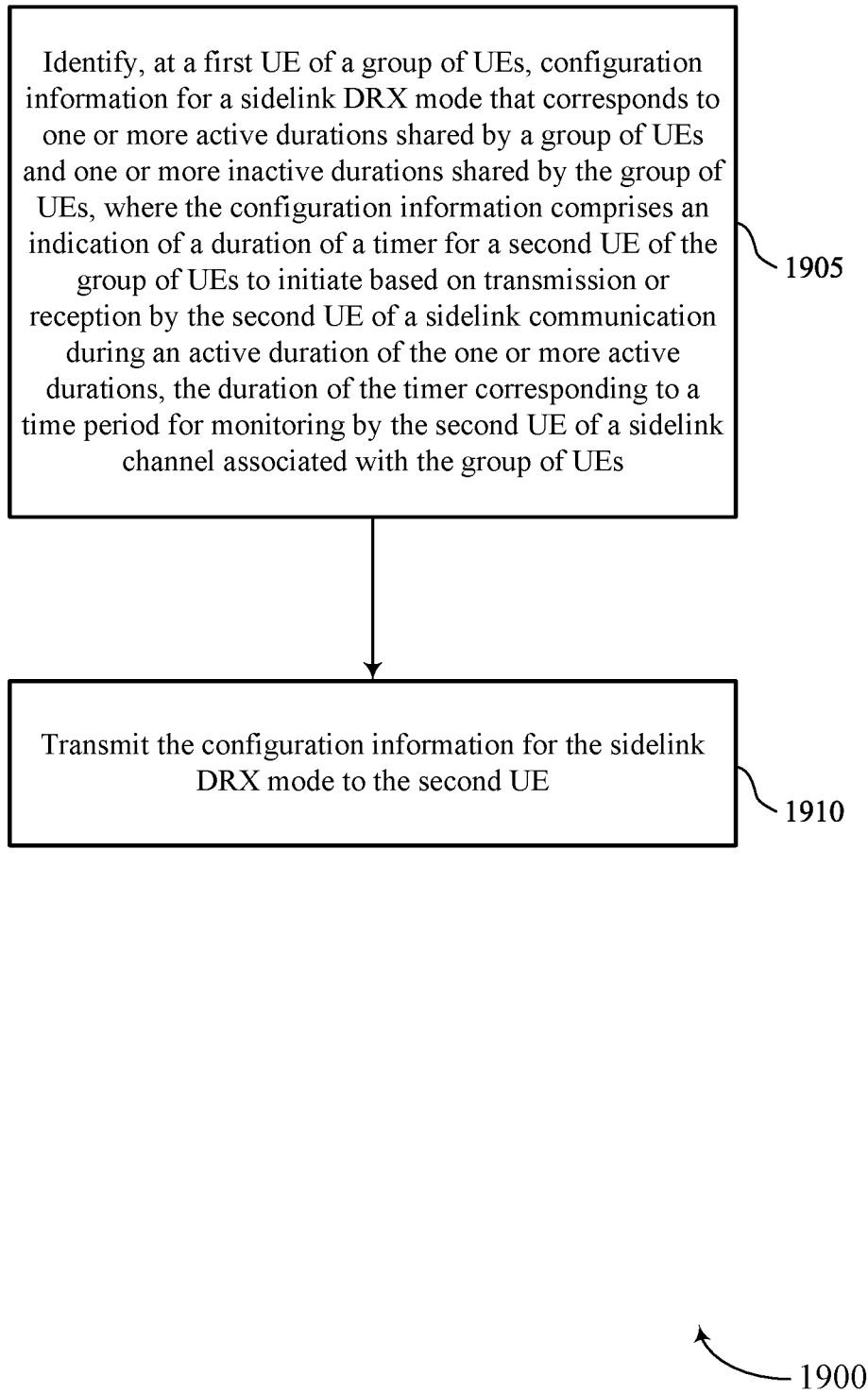

FIG. 19 shows a flowchart illustrating a method 1900 that supports timer-based DRX for sidelink communications in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include identifying (e.g., determining), at a first UE of a group of UEs, configuration information for a sidelink DRX mode that corresponds to one or more active durations shared by a group of UEs and one or more inactive durations shared by the group of UEs, where the configuration information comprises an indication of a duration of a timer (e.g., an inactivity timer as described herein) for a second UE of the group of UEs to initiate based on transmission or reception by the second UE of a sidelink communication during an active duration of the one or more active durations, the duration of the timer corresponding to a time period for monitoring by the second UE of a sidelink channel associated with the group of UEs. The transmission by the second UE of the sidelink communication may be a transmission to another UE of the group of UEs (e.g., the first UE or some other UE of the group of UEs). Additionally or alternatively, the reception by the second UE of the sidelink communication may be a reception by the second UE from another UE of the group of UEs (e.g., the first UE or some other UE of the group of UEs). In some cases, the first UE may be a relay UE as described herein. Additionally or alternatively, the first UE may be a target UE as described herein. The operations of 1905 may be performed in accordance with examples as disclosed herein. In some examples, aspects of the operations of 1905 may be performed by a configuration determination component 1255 as described with reference to FIG. 12. Additionally or alternatively, means for performing 1905 may, but not necessarily, include, for example, antenna 1325, transceiver 1315, communications manager 1320, memory 1330 (including code 1335), processor 1340 and/or bus 1345.

At 1910, the method may include transmitting the configuration information for the sidelink DRX mode to the second UE. The operations of 1910 may be performed in accordance with examples as disclosed herein. In some examples, aspects of the operations of 1910 may be performed by a configuration transmission component 1245 as described with reference to FIG. 12. Additionally or alternatively, means for performing 1905 may, but not necessarily, include, for example, antenna 1325, transceiver 1315, communications manager 1320, memory 1330 (including code 1335), processor 1340 and/or bus 1345.

Figure 20:
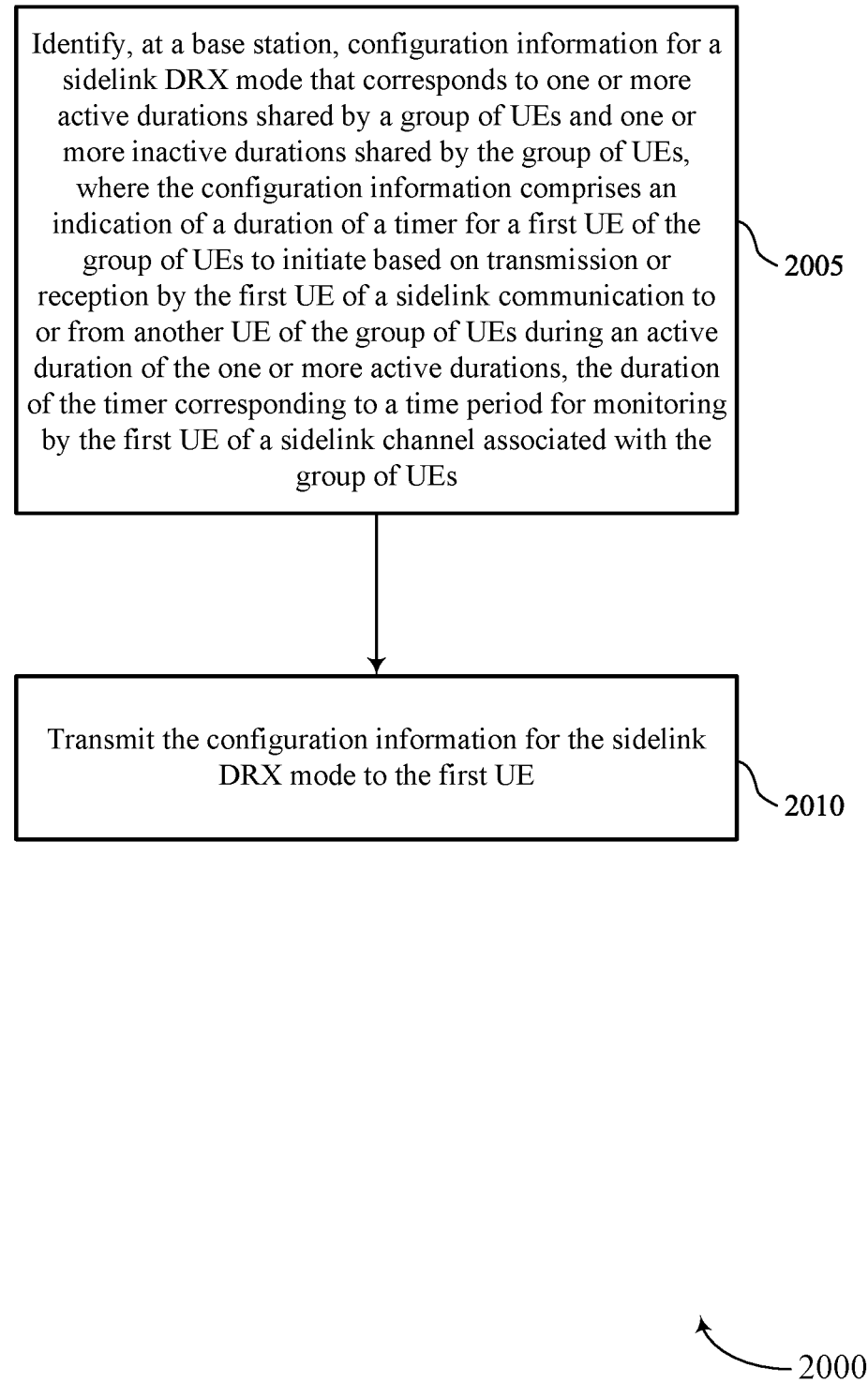

FIG. 20 shows a flowchart illustrating a method 2000 that supports timer-based DRX for sidelink communications in accordance with aspects of the present disclosure. The operations of the method 2000 may be implemented by a base station or its components as described herein. For example, the operations of the method 2000 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2005, the method may include identifying (e.g., determining), at a base station, configuration information for a sidelink DRX mode that corresponds to one or more active durations shared by a group of UEs and one or more inactive durations shared by the group of UEs, where the configuration information comprises an indication of a duration of a timer (e.g., an inactivity timer as described herein) for a first UE of the group of UEs to initiate based on transmission or reception by the first UE of a sidelink communication to or from another UE of the group of UEs during an active duration of the one or more active durations, the duration of the timer corresponding to a time period for monitoring by the first UE of a sidelink channel associated with the group of UEs. The operations of 2005 may be performed in accordance with examples as disclosed herein. In some examples, aspects of the operations of 2005 may be performed by a configuration transmission component 1625 as described with reference to FIG. 16. Additionally or alternatively, means for performing 2005 may, but not necessarily, include, for example, antenna 1325, transceiver 1315, communications manager 1320, memory 1330 (including code 1335), processor 1340 and/or bus 1345.

At 2010, the method may include transmitting the configuration information for the sidelink DRX mode to the first UE. The operations of 2005 may be performed in accordance with examples as disclosed herein. In some examples, aspects of the operations of 2005 may be performed by a configuration transmission component 1625 as described with reference to FIG. 16. Additionally or alternatively, means for performing 2005 may, but not necessarily, include, for example, antenna 1325, transceiver 1315, communications manager 1320, memory 1330 (including code 1335), processor 1340 and/or bus 1345.

The following provides an overview of aspects of the present disclosure:

Aspect 1: A method for wireless communication at a first UE of a group of UEs, comprising: receiving configuration information for a sidelink DRX mode that corresponds to one or more active durations shared by the group of UEs and one or more inactive durations shared by the group of UEs, wherein the configuration information indicates a duration of a timer; transmitting or receiving, to or from another UE of the group of UEs, a sidelink communication during an active duration of the one or more active durations; initiating the timer based at least in part on transmitting or receiving the sidelink communication during the active duration; and monitoring a sidelink channel associated with the group of UEs after initiating the timer and for a time period based at least in part on the duration of the timer.

Aspect 2: The method of aspect 1, wherein monitoring for the one or more additional sidelink communications comprises: monitoring the sidelink channel during at least a portion of a first inactive duration of the one or more inactive durations based at least in part on a value of the timer, at a beginning of the first inactive duration, being less than the duration of the timer.

Aspect 3: The method of aspect 1, further comprising: pausing the timer based at least in part on a value of the timer, at a beginning of a first inactive duration of the one or more inactive durations, being less than the duration of the timer; refraining from monitoring the sidelink channel during the first inactive duration; and restarting the timer based at least in part on a beginning of a second active duration of the one or more active durations, the second active duration, wherein monitoring the sidelink channel comprises monitoring the sidelink channel during at least a portion of the second active duration based at least in part on restarting the timer at the beginning of the second active duration.

Aspect 4: The method of aspect 1, further comprising: terminating the timer based at least in part on a beginning of a first inactive duration of the one or more inactive durations, wherein a value of the timer at the beginning of the first inactive duration is less than the duration of the timer; and refraining from monitoring the sidelink channel during the first inactive duration.

Aspect 5: The method of aspect 1, further comprising: terminating the timer, during the active duration or a second active duration of the one or more active duration, based at least in part on a value of the timer reaching the duration of the timer; and refraining from monitoring, based at least in part on terminating the timer, for sidelink communications during a portion of the active duration or a portion of the second active duration.

Aspect 6: The method of aspect 5, wherein each of the one or more active durations comprises one or more monitoring occasions for the first UE, and wherein the sidelink communication is transmitted or received during a first monitoring occasion for the first UE, the method further comprising: monitoring, after the portion of the active duration or the portion of the second active duration, for the one or more additional sidelink communications during a second monitoring occasion for the first UE.

Aspect 7: The method of any of aspects 1 through 6, further comprising: transmitting or receiving, to or from the second UE or a third UE of the group of UEs, a second sidelink communication before a value of the timer reaches the duration of the timer; reinitiating the timer based at least in part on transmitting or receiving the second sidelink communication before the value of the timer reaches the duration of the timer; and continuing to monitor the sidelink channel after reinitiating the timer and for a time period based at least in part on the duration of the timer.

Aspect 8: The method of any of aspects 1 through 7, further comprising: initiating a second timer based at least in part on entering a second active duration of the one or more active durations after a first inactive duration of the one or more inactive durations, wherein the configuration information indicates a second duration of the second timer; refraining from monitoring, after initiating the second timer and for a time period based at least in part on the second duration of the second timer, the sidelink channel during a first portion of the second active duration; and monitoring the sidelink channel during a second portion of the second active duration based at least in part on a value of the second timer reaching the second duration, the second portion after the first portion.

Aspect 9: The method of any of aspects 1 through 8, wherein receiving the configuration information comprises: receiving the configuration information from a base station.

Aspect 10: The method of any of aspects 1 through 8, wherein receiving the configuration information comprises: receiving the configuration information from a second UE of the group of UEs.

Aspect 11: The method of any of aspects 1 through 10, further comprising: transmitting an indication of one or more preferences for the sidelink DRX mode, wherein receiving the configuration information is based at least in part on transmitting the indication of the one or more preferences.

Aspect 12: The method of any of aspects 1 through 11, wherein the group of UEs is associated with a first service and a second group of UEs is associated with a second service; and the one or more active durations comprise a first set of monitoring occasions for the group of UEs that at least partially overlaps in time with a second set of monitoring occasions for the second set of UEs.

Aspect 13: The method of any of aspects 1 through 12, further comprising: receiving, during a first monitoring occasion for the first UE within a first active duration of the one or more active durations, a message from a second UE of the group of UEs via the sidelink channel, the first monitoring occasion for the first UE at least partially overlapping in time with a second monitoring occasion for the second UE within the first active duration.

Aspect 14: The method of any of aspects 1 through 12, further comprising: identifying a first set of monitoring occasions for the first UE within a first active duration of the one or more active durations; receiving, from a base station, a first message corresponding to a second message for a second UE of the group of UEs; transmitting the second message to the second UE of the group of UEs via the sidelink channel during a monitoring occasion for the second UE within the first active duration, wherein transmitting the second message occurs outside of the first set of monitoring occasions for the first UE.

Aspect 15: A method for wireless communication at a first UE of a group of UEs, comprising: transmitting, to a second UE of the group of UEs, configuration information for a sidelink DRX mode, wherein the sidelink DRX mode corresponds to one or more active durations shared by the group of UEs and one or more inactive durations shared by the group of UEs, and wherein the configuration information indicates a duration of a timer for the second UE to initiate based at least in part on transmission or reception by the second UE of a sidelink communication (e.g., to or from the second UE or another UE of the group of UEs) during an active duration of the one or more active durations, the duration of the timer corresponding to a time period for monitoring by the second UE of a sidelink channel associated with the group of UEs.

Aspect 16: The method of aspect 15, wherein the first UE is a group leader for the group of UEs, further comprising: determining the configuration information based at least in part on the first UE being the group leader, wherein transmitting the configuration information is based at least in part on determining the configuration information.

Aspect 17: The method of any of aspects 15 through 16, further comprising: receiving, from a base station, an indication of a set of sidelink discontinuous mode configurations; and determining the configuration information based at least in part on selecting a sidelink discontinuous mode configuration from the set of sidelink discontinuous mode configurations, wherein transmitting the configuration information is based at least in part on determining the configuration information.

Aspect 18: The method of aspect 15, further comprising: receiving the configuration information from a base station, wherein transmitting the configuration information to the second UE is based at least in part on receiving the configuration information from the base station.

Aspect 19: The method of any of aspects 15 through 18, further comprising: receiving, from a base station, a first message corresponding to a second message for the second UE; and transmitting, based at least in part on receiving the first message, the second message to the second UE via the sidelink channel during a monitoring occasion for the second UE within the one or more active durations.

Aspect 20: The method of aspect 19, further comprising: receiving, from the base station within the first message, an indication of the monitoring occasion for the second UE, wherein the monitoring occasion for the second UE is independent of a second monitoring occasion associated with the first UE.

Aspect 21: The method of aspect 19, further comprising: receiving an indication of the monitoring occasion for the second UE prior to receiving the first message, wherein the monitoring occasion is independent of a second monitoring occasion for the first UE.

Aspect 22: The method of aspect 19, wherein the monitoring occasion for the second UE at least partially overlaps in time with a second monitoring occasion for the first UE within the one or more active durations.

Aspect 23: A method for wireless communication at a base station, comprising: transmitting, to a first UE of a group of UEs, configuration information for a sidelink DRX mode, wherein the sidelink DRX mode corresponds to one or more active durations shared by the group of UEs and one or more inactive durations shared by the group of UEs, and wherein the configuration information indicates a duration of a timer for the first UE to initiate based at least in part on transmission or reception by the first UE of a sidelink communication to or from another UE of the group of UEs during an active duration of the one or more active durations, the duration of the timer corresponding to a time period for monitoring by the first UE of a sidelink channel associated with the group of UEs.

Aspect 24: The method of aspect 23, wherein transmitting the configuration information comprises: transmitting the configuration information for the first UE to a second UE of the group of UEs for relaying to the first UE.

Aspect 25: The method of any of aspects 23 through 24, further comprising: transmitting a first message to a second UE of the group of UEs, the first message for the second UE to transmit a corresponding second message to the first UE via the sidelink channel.

Aspect 26: The method of aspect 25, further comprising: transmitting, to the second UE, an indication of a monitoring occasion associated with the first UE for the sidelink channel, wherein the monitoring occasion is independent of a second monitoring occasion associated with the second UE for the sidelink channel.

Aspect 27: An apparatus for wireless communication at a first UE of a group of UEs, comprising a processor; memory coupled with the processor; and instructions stored in the memory and executable by the processor to cause the apparatus to perform a method of any of aspects 1 through 14.

Aspect 28: An apparatus for wireless communication at a first UE of a group of UEs, comprising at least one means for performing a method of any of aspects 1 through 14.

Aspect 29: A non-transitory computer-readable medium storing code for wireless communication at a first UE of a group of UEs, the code comprising instructions executable by a processor to perform a method of any of aspects 1 through 14.

Aspect 30: An apparatus for wireless communication at a first UE of a group of UEs, comprising a processor; memory coupled with the processor; and instructions stored in the memory and executable by the processor to cause the apparatus to perform a method of any of aspects 15 through 22.

Aspect 31: An apparatus for wireless communication at a first UE of a group of UEs, comprising at least one means for performing a method of any of aspects 15 through 22.

Aspect 32: A non-transitory computer-readable medium storing code for wireless communication at a first UE of a group of UEs, the code comprising instructions executable by a processor to perform a method of any of aspects 15 through 22.

Aspect 33: An apparatus for wireless communication at a base station, comprising a processor; memory coupled with the processor; and instructions stored in the memory and executable by the processor to cause the apparatus to perform a method of any of aspects 23 through 26.

Aspect 34: An apparatus for wireless communication at a base station, comprising at least one means for performing a method of any of aspects 23 through 26.

Aspect 35: A non-transitory computer-readable medium storing code for wireless communication at a base station, the code comprising instructions executable by a processor to perform a method of any of aspects 23 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE) of a group of UEs, comprising:
   receiving configuration information for a sidelink discontinuous reception mode that corresponds to one or more active durations shared by the group of UEs and one or more inactive durations shared by the group of UEs, wherein the configuration information indicates a duration of a timer;
   transmitting or receiving, to or from another UE of the group of UEs, a sidelink communication during an active duration of the one or more active durations;
   initiating the timer based at least in part on transmitting or receiving the sidelink communication during the active duration;
   monitoring a sidelink channel associated with the group of UEs after initiating the timer and for a time period based at least in part on the duration of the timer;
   pausing or terminating the timer based at least in part on a value of the timer, at a beginning of a first inactive duration of the one or more inactive durations, being less than the duration of the timer; and
   refraining from monitoring the sidelink channel during the first inactive duration.

2. The method of claim 1, wherein monitoring the sidelink channel comprises:
   monitoring the sidelink channel during at least a portion of a second inactive duration of the one or more inactive durations based at least in part on a second value of the timer, at a beginning of the second inactive duration, being less than the duration of the timer.

3. The method of claim 1, wherein pausing or terminating the timer comprises:
   pausing the timer based at least in part on the value of the timer, at the beginning of the first inactive duration of the one or more inactive durations, being less than the duration of the timer;
   restarting the timer based at least in part on a beginning of a second active duration of the one or more active durations, the second active duration after the first inactive duration; and
   monitoring the sidelink channel during at least a portion of the second active duration based at least in part on restarting the timer at the beginning of the second active duration.

4. The method of claim 1, wherein pausing or terminating the timer comprises:
   terminating the timer based at least in part on the beginning of the first inactive duration of the one or more inactive durations.

5. The method of claim 1, further comprising:
   terminating the timer, during a second active duration of the one or more active durations, based at least in part on a second value of the timer during the second active duration reaching the duration of the timer; and
   refraining from monitoring, based at least in part on terminating the timer, for sidelink communications during a portion of the second active duration.

6. The method of claim 5, wherein each of the one or more active durations comprises one or more monitoring occasions for the first UE, and wherein the sidelink communication is transmitted or received during a first monitoring occasion for the first UE, the method further comprising:
   monitoring, after the portion of the active duration or the portion of the second active duration, the sidelink channel during a second monitoring occasion for the first UE.

7. The method of claim 1, further comprising:
   transmitting or receiving, to or from the other UE or a third UE of the group of UEs, a second sidelink communication before the value of the timer reaches the duration of the timer;
   reinitiating the timer based at least in part on transmitting or receiving the second sidelink communication before the value of the timer reaches the duration of the timer; and
   continuing to monitor the sidelink channel after reinitiating the timer and for a second time period based at least in part on the duration of the reinitiated timer.

8. The method of claim 1, further comprising:
   initiating a second timer based at least in part on entering a second active duration of the one or more active durations after the first inactive duration of the one or more inactive durations, wherein the configuration information indicates a second duration of the second timer;
   refraining from monitoring, after initiating the second timer and for a second time period based at least in part on the second duration of the second timer, the sidelink channel during a first portion of the second active duration; and
monitoring the sidelink channel during a second portion of the second active duration based at least in part on a value of the second timer reaching the second duration, the second portion after the first portion.

9. The method of claim 1, wherein receiving the configuration information comprises:
receiving the configuration information from a base station.

10. The method of claim 1, wherein receiving the configuration information comprises:
receiving the configuration information from a second UE of the group of UEs.

11. The method of claim 1, further comprising:
transmitting an indication of one or more preferences for the sidelink discontinuous reception mode, wherein receiving the configuration information is based at least in part on transmitting the indication of the one or more preferences.

12. The method of claim 1, wherein:
the group of UEs is associated with a first service and a second group of UEs is associated with a second service; and
the one or more active durations comprise a first set of monitoring occasions for the group of UEs that at least partially overlaps in time with a second set of monitoring occasions for the second group of UEs.

13. The method of claim 1, further comprising:
receiving, during a first monitoring occasion for the first UE within a first active duration of the one or more active durations, a message from a second UE of the group of UEs via the sidelink channel, the first monitoring occasion for the first UE at least partially overlapping in time with a second monitoring occasion for the second UE within the first active duration.

14. The method of claim 1, further comprising:
identifying a first set of monitoring occasions for the first UE within a first active duration of the one or more active durations;
receiving, from a base station, a first message corresponding to a second message for a second UE of the group of UEs; and
transmitting the second message to the second UE via the sidelink channel during a monitoring occasion for the second UE within the first active duration, wherein transmitting the second message occurs outside of the first set of monitoring occasions for the first UE.

15. A method for wireless communication at a first user equipment (UE) of a group of UEs, comprising:
transmitting, to a second UE of the group of UEs, configuration information for a sidelink discontinuous reception mode,
wherein the sidelink discontinuous reception mode corresponds to one or more active durations shared by the group of UEs and one or more inactive durations shared by the group of UEs,
wherein the configuration information indicates a duration of a timer for the second UE to initiate based at least in part on transmission or reception by the second UE of a sidelink communication during an active duration of the one or more active durations, the duration of the timer corresponding to a time period for monitoring by the second UE of a sidelink channel associated with the group of UEs; and receiving an indication of a monitoring occasion for the second UE, wherein the monitoring occasion is independent of a second monitoring occasion for the first UE.

16. The method of claim 15, wherein the first UE is a group leader for the group of UEs, further comprising:
determining the configuration information based at least in part on the first UE being the group leader, wherein transmitting the configuration information is based at least in part on determining the configuration information.

17. The method of claim 15, further comprising:
receiving, from a base station, an indication of a set of sidelink discontinuous mode configurations; and
determining the configuration information based at least in part on selecting a sidelink discontinuous mode configuration from the set of sidelink discontinuous mode configurations, wherein transmitting the configuration information is based at least in part on determining the configuration information.

18. The method of claim 15, further comprising:
receiving the configuration information from a base station, wherein transmitting the configuration information to the second UE is based at least in part on receiving the configuration information from the base station.

19. The method of claim 15, further comprising:
receiving, from a base station, a first message corresponding to a second message for the second UE; and
transmitting, based at least in part on receiving the first message, the second message to the second UE via the sidelink channel during the monitoring occasion for the second UE within the one or more active durations.

20. The method of claim 19, wherein receiving the indication of the monitoring occasion comprises:
receiving, from the base station within the first message, the indication of the monitoring occasion for the second UE.

21. The method of claim 19, wherein receiving the indication of the monitoring occasion comprises:
receiving the indication of the monitoring occasion for the second UE prior to receiving the first message.

22. A method for wireless communication at a base station, comprising:
transmitting, to a first user equipment (UE) of a group of UEs, configuration information for a sidelink discontinuous reception mode,
wherein the sidelink discontinuous reception mode corresponds to one or more active durations shared by the group of UEs and one or more inactive durations shared by the group of UEs,
wherein the configuration information indicates a duration of a timer for the first UE to initiate based at least in part on transmission or reception by the first UE of a sidelink communication to or from another UE of the group of UEs during an active duration of the one or more active durations, the duration of the timer corresponding to a time period for monitoring by the first UE of a sidelink channel associated with the group of UEs; and
transmitting, to a second UE of the group of UEs, an indication of a monitoring occasion associated with the first UE for the sidelink channel, wherein the monitoring occasion is independent of a second monitoring occasion associated with the second UE for the sidelink channel.

23. The method of claim 22, wherein transmitting the configuration information comprises:
transmitting the configuration information for the first UE to the second UE of the group of UEs for relaying to the first UE.

24. The method of claim 22, further comprising:
transmitting a first message to the second UE of the group of UEs, the first message for the second UE to transmit a corresponding second message to the first UE via the sidelink channel.

25. An apparatus for wireless communication, comprising:
a processor of a user equipment (UE); and
memory coupled with the processor, the memory and the processor configured to:
receive configuration information for a sidelink discontinuous reception mode that corresponds to one or more active durations shared by a group of UEs that includes the UE and one or more inactive durations shared by the group of UEs, wherein the configuration information indicates a duration of a timer;
transmit or receive, to or from another UE of the group of UEs, a sidelink communication during an active duration of the one or more active durations;
initiate the timer based at least in part on transmitting or receiving the sidelink communication during the active duration;
monitor a sidelink channel associated with the group of UEs after initiating the timer and for a time period based at least in part on the duration of the timer;
pause or terminate the timer based at least in part on a value of the timer, at a beginning of a first inactive duration of the one or more inactive durations, being less than the duration of the timer; and
refrain from monitoring the sidelink channel during the first inactive duration.

26. The apparatus of claim 25, the memory and the processor further configured to:
monitor the sidelink channel during at least a portion of a second inactive duration of the one or more inactive durations based at least in part on a second value of the timer, at a beginning of the second inactive duration, being less than the duration of the timer.

27. The apparatus of claim 25, wherein, to pause or terminate the timer, the memory and the processor are configured to:
pause the timer based at least in part on the value of the timer, at the beginning of the first inactive duration of the one or more inactive durations, being less than the duration of the timer;
restart the timer based at least in part on a beginning of a second active duration of the one or more active durations, the second active duration after the first inactive duration; and
monitoring the sidelink channel during at least a portion of the second active duration based at least in part on restarting the timer at the beginning of the second active duration.

28. The apparatus of claim 25, wherein, to pause or terminate the timer, the memory and the processor are further configured to:
terminate the timer based at least in part on the beginning of the first inactive duration of the one or more inactive durations.

* * * * *